US010930205B2

(12) United States Patent
Kurokawa

(10) Patent No.: US 10,930,205 B2
(45) Date of Patent: Feb. 23, 2021

(54) DISPLAY SYSTEM AND MOVING OBJECT

(71) Applicant: Semiconductor Energy Laboratory Co., Ltd., Kanagawa-ken (JP)

(72) Inventor: Yoshiyuki Kurokawa, Kanagawa (JP)

(73) Assignee: Semiconductor Energy Laboratory Co., Ltd.

( * ) Notice: Subject to any disclaimer, the term of this patent is extended or adjusted under 35 U.S.C. 154(b) by 20 days.

(21) Appl. No.: 15/597,361

(22) Filed: May 17, 2017

(65) Prior Publication Data

US 2017/0337871 A1 Nov. 23, 2017

(30) Foreign Application Priority Data

May 19, 2016 (JP) .............................. JP2016-100337

(51) Int. Cl.
*G09G 3/3266* (2016.01)
*G09G 3/3291* (2016.01)
(Continued)

(52) U.S. Cl.
CPC ........... *G09G 3/3208* (2013.01); *B60K 35/00* (2013.01); *B60K 37/02* (2013.01); *G06F 3/147* (2013.01); *G06F 3/1423* (2013.01); *G09G 3/2096* (2013.01); *G09G 3/3266* (2013.01); *G09G 3/3291* (2013.01); *B60K 2370/152* (2019.05); *B60K 2370/1531* (2019.05); *B60K 2370/1533* (2019.05); *B60K 2370/331* (2019.05);
(Continued)

(58) Field of Classification Search
CPC ... G09G 2310/0232; G09G 2310/0286; G09G 2380/02; G09G 3/3208; G09G 2380/10; G09G 2320/0261; G09G 5/003; G09G 2310/027; G09G 2310/04; G09G 3/3426; G09G 2310/08; G09G 2340/0421; G09G 2340/0414–0435; G09G 2320/0686; B60K 2350/30; B60K 2350/106; B60K 2350/352; B60K 35/00; B60K 2370/40; B60K 2370/52; G06F 3/1423; G06F 3/1431; G06T 3/00; G06T 3/40; G06T 5/006; G02B 27/2221
See application file for complete search history.

(56) References Cited

U.S. PATENT DOCUMENTS 5,877,740 A * 3/1999 Hirakata .............. G09G 3/3688
345/103
6,876,339 B2 4/2005 Hiroki
(Continued)

FOREIGN PATENT DOCUMENTS

JP 2013-134295 A 7/2013

*Primary Examiner* — Patrick N Edouard
*Assistant Examiner* — Douglas M Wilson
(74) *Attorney, Agent, or Firm* — Husch Blackwell LLP

(57) ABSTRACT

A novel display system and a moving object are provided. The display system includes a display panel and a display driver. The display panel has a curved shape. The display panel includes a first display region and a second display region on the curved surface. The display driver generates first analog data by a first clock signal and first digital data and generates second analog data by a second clock signal and second digital data. An image can be displayed in accordance with the curved shape of the display panel by transmitting the first analog data to the first display region and transmitting the second analog data to the second display region.

14 Claims, 15 Drawing Sheets

(51) Int. Cl.

| | | |
|---|---|---|
| *G06F 3/147* | (2006.01) | |
| *G09G 3/20* | (2006.01) | |
| *G09G 3/00* | (2006.01) | |
| *H04N 13/366* | (2018.01) | |
| *G06T 3/00* | (2006.01) | |
| *G09G 3/3208* | (2016.01) | |
| *B60K 35/00* | (2006.01) | |
| *B60K 37/02* | (2006.01) | |
| *G06F 3/14* | (2006.01) | |

(52) U.S. Cl.
CPC ...... *B60K 2370/40* (2019.05); *B60K 2370/52* (2019.05); *G06T 3/005* (2013.01); *G09G 3/003* (2013.01); *G09G 2310/027* (2013.01); *G09G 2310/0213* (2013.01); *G09G 2310/0232* (2013.01); *G09G 2310/0286* (2013.01); *G09G 2310/08* (2013.01); *G09G 2320/0261* (2013.01); *G09G 2320/0285* (2013.01); *G09G 2320/0686* (2013.01); *G09G 2340/02* (2013.01); *G09G 2340/0421* (2013.01); *G09G 2380/02* (2013.01); *H04N 13/366* (2018.05)

(56) References Cited

U.S. PATENT DOCUMENTS

| | | |
|---|---|---|
| 7,190,360 B1 | 3/2007 | Hiroki |
| 7,639,058 B2 | 12/2009 | Kurokawa et al. |
| 7,663,447 B2 | 2/2010 | Matsuzaki |
| 7,782,315 B2 | 8/2010 | Hiroki |
| 8,095,104 B2 | 1/2012 | Kawae et al. |
| 8,103,897 B2 | 1/2012 | Endo et al. |
| 8,510,588 B2 | 8/2013 | Endo et al. |
| 9,479,145 B2 | 10/2016 | Okamoto et al. |
| 9,569,713 B2 | 2/2017 | Yoneda et al. |
| 2012/0081186 A1 | 4/2012 | Kawae et al. |
| 2012/0092363 A1* | 4/2012 | Kim ................. G06F 3/147 345/618 |
| 2014/0340431 A1* | 11/2014 | Yamakawa .......... G09G 3/3426 345/690 |
| 2014/0368479 A1* | 12/2014 | Bae .................... G09G 5/18 345/204 |
| 2015/0172545 A1* | 6/2015 | Szabo ............... H04N 5/23238 348/36 |
| 2015/0286457 A1* | 10/2015 | Kim ................... G02B 6/0078 345/581 |
| 2016/0366360 A1 | 12/2016 | Okamoto et al. |
| 2017/0047001 A1* | 2/2017 | Shin ................... G09G 3/3688 |
| 2017/0123505 A1* | 5/2017 | Markovic ............ G06T 3/40 |
| 2017/0141776 A1 | 5/2017 | Kozuma |
| 2017/0236466 A1* | 8/2017 | Spitzer ............... G09G 3/3275 345/560 |
| 2017/0330531 A1 | 11/2017 | Yamazaki et al. |
| 2017/0337867 A1 | 11/2017 | Yamazaki et al. |

* cited by examiner

301

311

302

311

303

311

304

311

DISPLAY SYSTEM AND MOVING OBJECT

BACKGROUND OF THE INVENTION

1. Field of the Invention

One embodiment of the present invention relates to a display system and a moving object, and particularly relates to a display system including a display panel whose display surface is curved and a moving object including a flexible display panel.

2. Description of the Related Art

A curved display including an organic electroluminescent (EL) element has been proposed (e.g., in Patent Document 1). Note that the curved display means a display including a curved display surface.

A system using a flexible organic EL display for an automobile windshield has been proposed. The flexible display is light, unlike glass, and expected to achieve a function of assisting driver's driving by displaying information other than visual information.

REFERENCE

Patent Document

[Patent Document 1] Japanese Published Patent Application No. 2013-134295

SUMMARY OF THE INVENTION

An automobile windshield has a complex shape such as a curved surface in terms of design. To display information on an automobile windshield having such a shape as a display screen, it is necessary to perform image processing on image data that should be visually perceived by a driver in accordance with the form of an automobile windshield. It is necessary to perform such image processing using a large-scale frame memory and a high-throughput image processing circuit, or a graphics processing unit (GPU), which leads to high power consumption.

An object of one embodiment of the present invention is to provide a novel display system and a moving object or the like including the display system.

Another object of one embodiment of the present invention is to provide a novel display system with low power consumption, and a moving object or the like including the display system. Another object of one embodiment of the present invention is to provide a novel display system capable of improving the visibility, and a moving object or the like including the display system.

Note that the objects of one embodiment of the present invention are not limited to the above objects. The objects described above do not disturb the existence of other objects. The other objects are the ones that are not described above and will be described below. The other objects will be apparent from and can be derived from the description of the specification, the drawings, and the like by those skilled in the art. One embodiment of the present invention is to solve at least one of the aforementioned objects and the other objects. One embodiment of the present invention need not solve all the aforementioned objects and the other objects.

(1) One embodiment of the present invention is a display system including a display panel and a display driver. The display panel includes a first display region and a second display region. The first display region is narrower than the second display region. The display driver is configured to generate first analog data by a first clock signal and first digital data and to generate second analog data by a second clock signal and second digital data. A frequency of the first clock signal is lower than a frequency of the second clock signal. The display driver transmits the first analog data to the first display region and transmits the second analog data to the second display region.

(2) Another embodiment of the present invention is the display system according to (1). The display panel includes a curved display surface. The curved display surface includes the first display region and the second display region.

(3) Another embodiment of the present invention is the display system according to (1) or (2) further including an image sensor. The image sensor is configured to specify the position of an object. The proportion of the first region to the second region can be changed when the position of the object is moved from a first point to a second point (4) Another embodiment of the present invention is the display system according to any one of (1) to (3). The display driver includes a shift register and a digital-analog conversion circuit. Any one of the first clock signal and the second clock signal is input to the shift register. Any one of the first digital data and the second digital data is input to the digital-analog conversion circuit.

(5) Another embodiment of the present invention is the display system according to any one of (1) to (4) further including an oscillator circuit. The oscillator circuit is electrically connected to the display driver. The oscillator circuit includes an inverter and a circuit. The circuit includes a first terminal and a second terminal. The first terminal is electrically connected to an output terminal of the inverter. The circuit is configured to change a resistance between the first terminal and the second terminal. When a resistance between the first terminal and the second terminal of the circuit is a first resistance, the oscillator circuit is configured to generate the first clock signal corresponding to the first resistance and supply the first clock signal to the display driver owing to the configuration of changing the resistance. When a resistance between the first terminal and the second terminal of the circuit is a second resistance, the oscillator circuit is configured to generate the second clock signal corresponding to the second resistance and supply the second clock signal to the display driver owing to the configuration of changing the resistance. The first resistance is higher than the second resistance.

(6) Another embodiment of the present invention is the display system according to (5). The circuit further includes a data retention circuit. The data retention circuit includes a third terminal and a fourth terminal. The third terminal is electrically connected to the first terminal. The fourth terminal is electrically connected to the second terminal. The data retention circuit is configured to store data. The data retention circuit is configured to select whether the third terminal and the fourth terminal are electrically disconnected from each other or the resistance between the third terminal and the fourth terminal is set to a value based on the data.

(7) Another embodiment of the present invention is the display system according to any one of (1) to (6). The display panel includes a transistor and a display element electrically connected to the transistor. The transistor includes an oxide semiconductor in a channel formation region.

(8) Another embodiment of the present invention is the display system according to any one of (1) to (7). The display element is an organic electroluminescent element.

(9) Another embodiment of the present invention is a moving object including the display system according to any one of (1) to (8).

According to one embodiment of the present invention, a novel display system and a moving object or the like including the display system can be provided.

According to another embodiment of the present invention, a novel display system with low power consumption, and a moving object or the like including the display system can be provided. According to another embodiment of the present invention, a novel display system capable of improving the visibility, and a moving object or the like including the display system can be provided.

Note that the effects of one embodiment of the present invention are not limited to the above effects. The effects described above do not disturb the existence of other effects. The other effects are the ones that are not described above and will be described below. The other effects will be apparent from and can be derived from the description of the specification, the drawings, and the like by those skilled in the art. One embodiment of the present invention is to have at least one of the aforementioned effects and the other effects. Accordingly, one embodiment of the present invention does not have the aforementioned effects in some cases.

DETAILED DESCRIPTION OF THE INVENTION

Figure 1A:
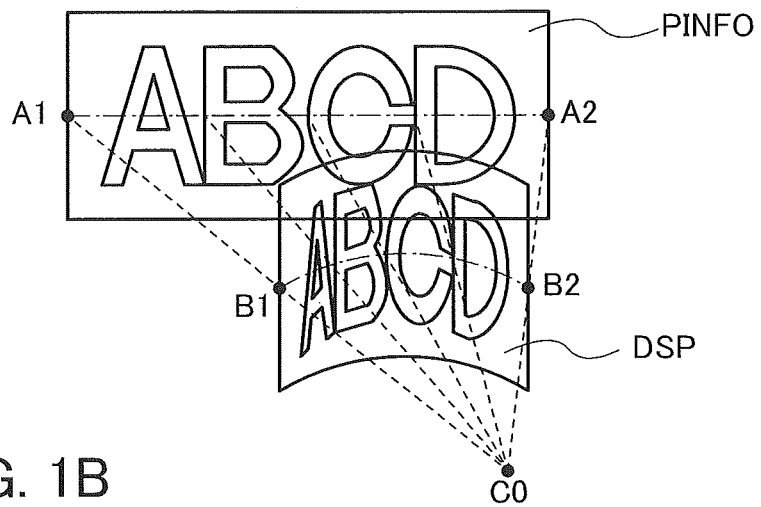
FIGS. 1A to 1C illustrate a display system.

Hereinafter, embodiments of the present invention will be described with reference to the accompanying drawings. Note that the embodiments of the present invention can be implemented with various modes, and it is readily appreciated by those skilled in the art that modes and details can be changed in various ways without departing from the spirit and scope of the present invention. Thus, the present invention should not be interpreted as being limited to the following description of the embodiments.

In this specification and the like, ordinal numbers such as first, second, and third are used in order to avoid confusion among components. Thus, the terms do not limit the number or order of components.

The same elements or elements having similar functions, elements formed using the same material, elements formed at the same time, or the like in the drawings are denoted by the same reference numerals, and the description thereof is not repeated in some cases.

<Mode of Display Device used for Display System>

A structure example of a display system of one embodiment of the present invention will be described. This display system can be used for a display (also referred to as a display panel) having a curved display surface.

An example of a curved display surface is an instrument panel or a windshield of a moving object such as an automobile. Examples of moving objects other than automobiles include buses, trains, and airplanes.

Figure 2A:
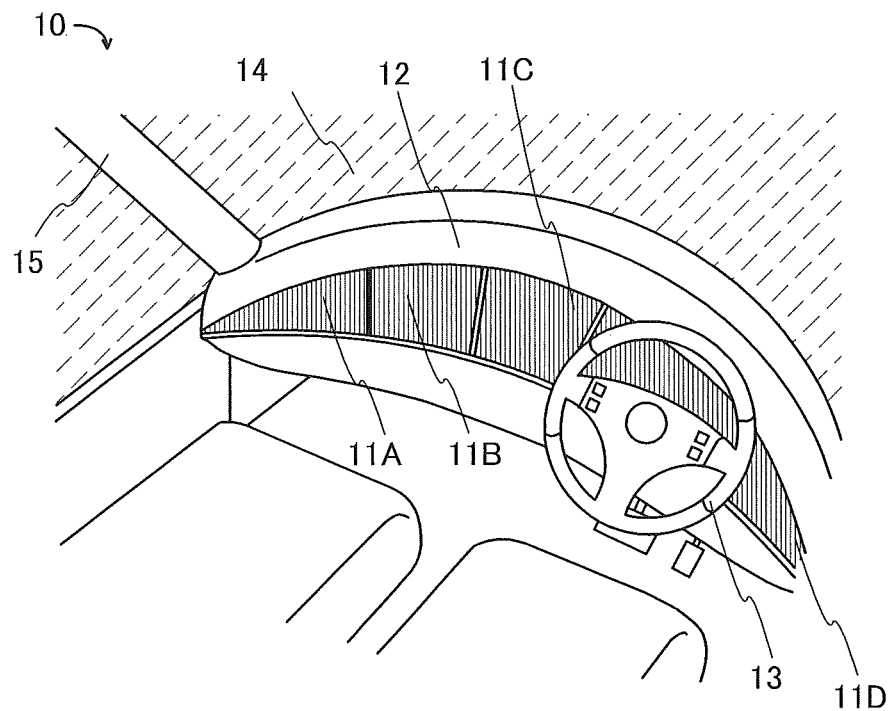
FIGS. 2A and 2B illustrate a structure of display panels in a moving object.

In FIG. 2A, an instrument panel of a moving object and its vicinity are illustrated, and the instrument panel is provided with a display panel capable of being used for a display system. In a moving object 10 illustrated in FIG. 2A, a plurality of display panels 11A to 11D which are provided on a dashboard 12, a steering wheel 13, a window 14, and a pillar 15 are provided.

Figure 2B:
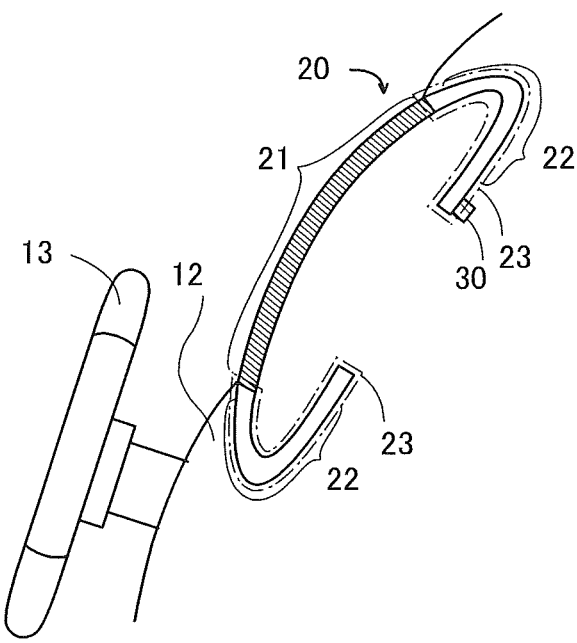

FIG. 2B is a cross-sectional schematic diagram of a display panel which is capable of being used as the display panels 11A to 11D in FIG. 2A. FIG. 2B illustrates the dashboard 12, the steering wheel 13, and a display panel 20, which is any of the display panels 11A to 11D, attached to the curved surface of the dashboard 12. The display panel 20 includes a display region 21, a non-display region 22, and a control IC 30.

In the display panel 20, a transistor, a display element, and the like are provided over a flexible base. Thus, the display panel 20 is flexible, and the display panel 20 can be attached to the dashboard 12 by being bent at bending portions 23 as illustrated in FIG. 2B. These bending portions 23 make a region where the non-display region 22 and the display region 21 of the display panel 20 overlap with each other.

The control IC 30 has a function of generating image data to perform display of the display panel 20. The control IC 30 includes a memory circuit, a correction circuit, and the like, and generates image data to be written to pixels in the display region 21.

The memory circuit of the control IC 30 has a function of storing positional data of pixels which form the display region 21 and positional data of pixels which form the non-display region 22 in a region of a pixel portion included in the display panel 20. The display system of one embodiment of the present invention includes a plurality of display panels. In each of the plurality of display panels, the display region 21 and the non-display region 22 are made different from those in another display panel. Therefore, each of the display panels is provided with a memory circuit which is capable of storing positional data of pixels in the display region 21 and positional data of pixels in the non-display region 22.

The correction circuit of the control IC 30 has a function of generating image data to be written in pixels in the display region 21 in the region of the pixel portion included in the display panel 20. That is, the correction circuit of the control IC 30 can correct image data so as not to provide image data to pixels in the non-display region 22 and provide image data only to pixels in the display region 21. This makes it possible to rewrite image data only in pixels contributing to display. Thus, unnecessary image data writing is eliminated, so that the power consumption can be reduced accordingly.

Each of the display panels includes a correction circuit of the control IC 30. This structure makes it possible for the display panel to generate and output image data for pixels in each of the display regions on the basis of information about pixels which form the display region, which differs between the display panels.

Figure 3:
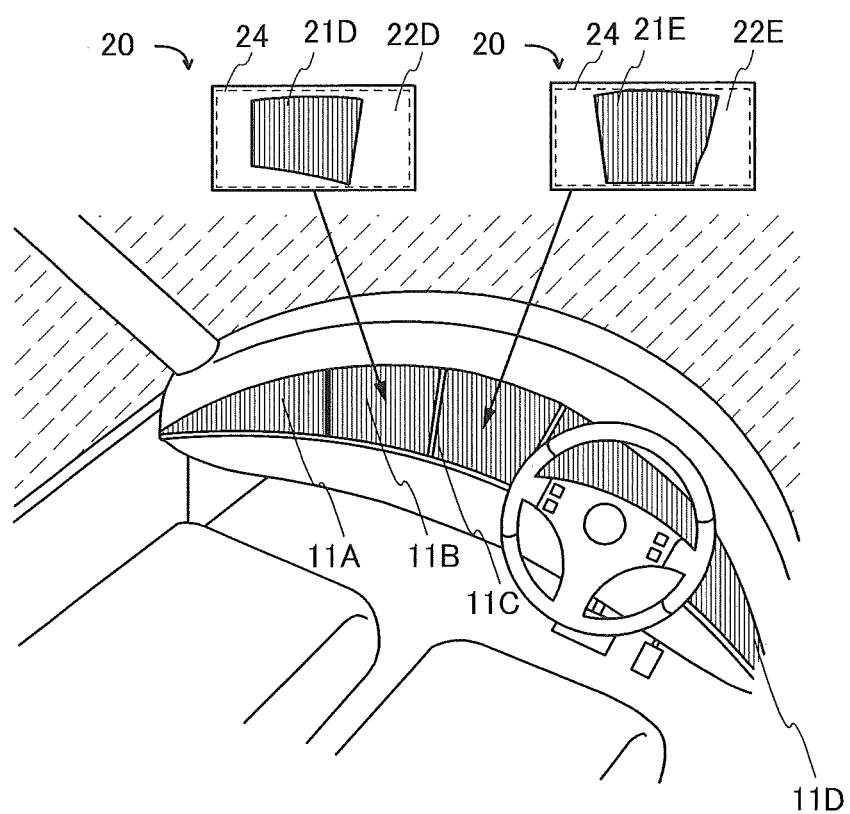
FIG. 3 illustrates a structure of display panels in a moving object.

FIG. 3 illustrates a specific example of a display panel used for the display system of one embodiment of the present invention. FIG. 3 illustrates the plurality of display panels 11A to 11D attached to the dashboard 12 in the moving object 10 in FIG. 2A. The display panels 11A to 11D in FIG. 3 have differently shaped display surfaces. For example, the display panels 11B and 11C in FIG. 3 have differently shaped display surfaces.

A display surface having a complex shape like the display surfaces of the display panels 11A to 11D in FIG. 3 is formed using a combination use of a plurality of differently shaped display panels. The display system of one embodiment of the present invention is effective in forming such a structure. The display system of one embodiment of the present invention includes a plurality of display panels which are bent and whose display regions are different. These display panels can be formed by bending the display panels having different display regions at their non-display regions and thus can be formed from the same base panel. Therefore, the efficiency of mass production can be increased. The use of a display panel used for the display system of one embodiment of the present invention can reduce the fabrication costs.

Note that for the display panel in the display system of one embodiment of the present invention, a structure in which non-display regions of a plurality of display panels overlap with each other is also effective. In this case, a pixel included in a non-display region performs black display, so that the overlapping regions can be made inconspicuous. In the case of a rectangular display panel, it is difficult to bend all the four sides. Therefore, a structure in which the non-display regions perform black display and overlap with each other is effective in employing a structure in which the non-display regions along two sides of the rectangular display panel are bent and the non-display regions along the other two sides perform black display and overlap with each other.

In the case of FIG. 3, the display panels 11B and 11C can be formed using the same display panels. That is, the display panels 11B and 11C can be formed from the display panels 20 including the same pixel portions 24 as illustrated in FIG. 3. Specifically, in the case of the display panel 11B, the display panel 20 is divided into a display region 21D and a non-display region 22D, and in the case of the display panel 11C, another display panel 20 is divided into a display region 21E and a non-display region 22E. Then, information showing the display region and information showing the non-display region are stored in the memory circuits and different pieces of image data are output from their correction circuits on the basis of this data. The non-display regions 22D and 22E not serving as display surfaces are provided so as to have regions overlapping with the display regions when the display panels 20 are bent, so that a space for attaching the display panel 20 can be reduced. In addition, a complex-shaped display surface like the display surfaces formed using the display panels 11A to 11D in FIG. 3 can be formed, and the display system that can improve design can be achieved.

Figure 4A:
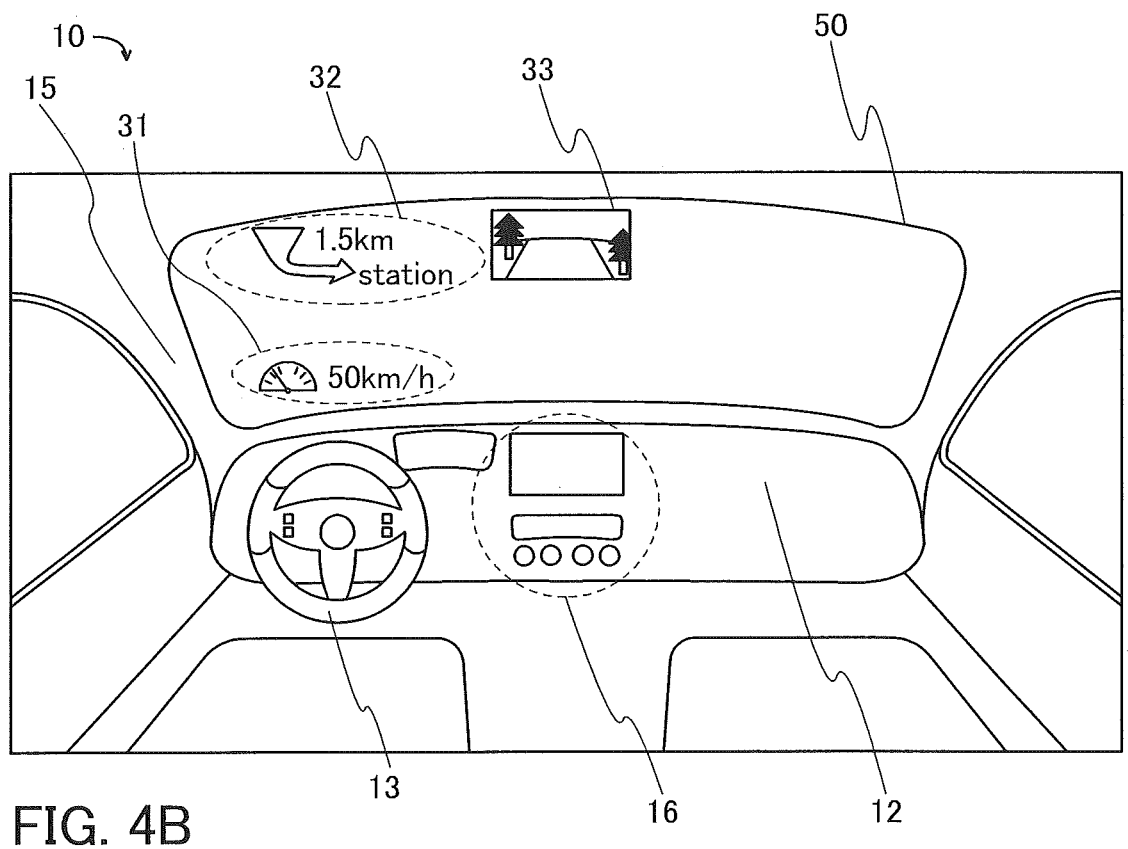
FIGS. 4A and 4B illustrate a structure of a display panel in a moving object.

In FIG. 4A, a windshield of a moving object and its vicinity are illustrated, and the windshield is provided with a display panel used for a display system. In the moving object 10 in FIG. 4A, a display panel 50 provided on a window portion, the dashboard 12, an instrument panel 16 provided on the dashboard, and a pillar 15 are provided.

Figure 4B:
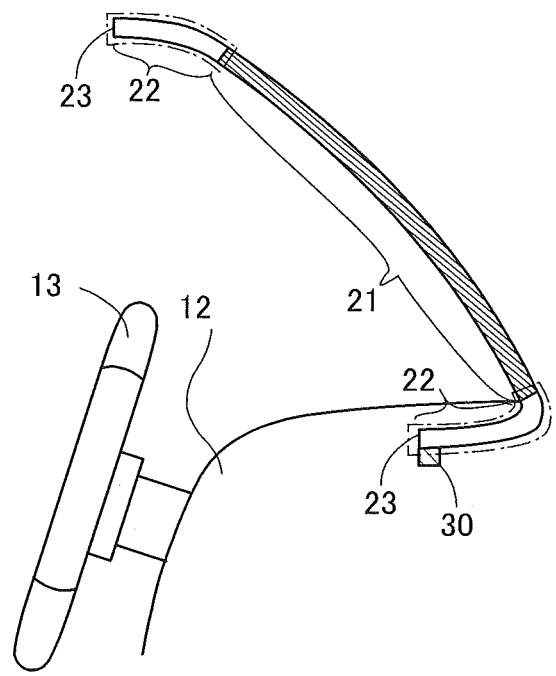

FIG. 4B is a cross-sectional schematic diagram of the display panel 50 in FIG. 4A. FIG. 4B illustrates the dashboard 12 and the steering wheel 13. The display panel 50 includes the display region 21, the non-display region 22, and the control IC 30.

For the display panel 50, a structure in which a windshield serves as a support substrate which is provided with a transistor, a display element, and the like is preferably employed. Alternatively, a structure in which a transistor, a display element, and the like are provided over a light-transmitting and flexible base and the base is attached to the windshield of the moving object may be employed for the display panel 50.

The above description is referred to for the control IC 30.

It is preferable to display information necessary for driving on the display panel 50. For example, an image 31 such as a meter can be displayed in the display panel 50. As examples of the image 31, a speedometer, a tachometer, a gasoline meter, and the like can be given. In some cases, mileage may be displayed.

For example, an image 32 of a navigation system can be displayed in the display panel 50. As examples of the image 32 of the navigation system, a destination, the distance to a destination, directional display, a map showing the position, and the like can be given.

For example, an image 33 of the back of the moving object can be displayed in the display panel 50 instead of using an inner rearview mirror. Note that in that case, it is necessary to provide an imaging device at the back of the moving object as a unit for photographing the back of the moving object.

Although not illustrated in FIG. 4A, the following can be displayed in the display panel 50, for example: an indicator, and a display light and a warning light such as an upward display lamp of a headlight, a water-temperature gauge, a fog light, an engine warning light, an oil pressure warning light, a battery of a charge warning light, a warning light for a passenger not wearing a seat belt, and a brake warning light.

One embodiment of the present invention is not limited to the above mode. For example, one embodiment of the present invention may be a display system projecting an image on a windshield by providing a projection device on the dashboard 12.

<Principle of Display System>

A windshield or an instrument panel of the moving object has a complex shape such as a curved surface in terms of design. When a display device is incorporated into the windshield or the instrument panel, it is necessary to perform image processing on image data that should be visually perceived by a driver in accordance with the form of the display device.

Figure 1B:
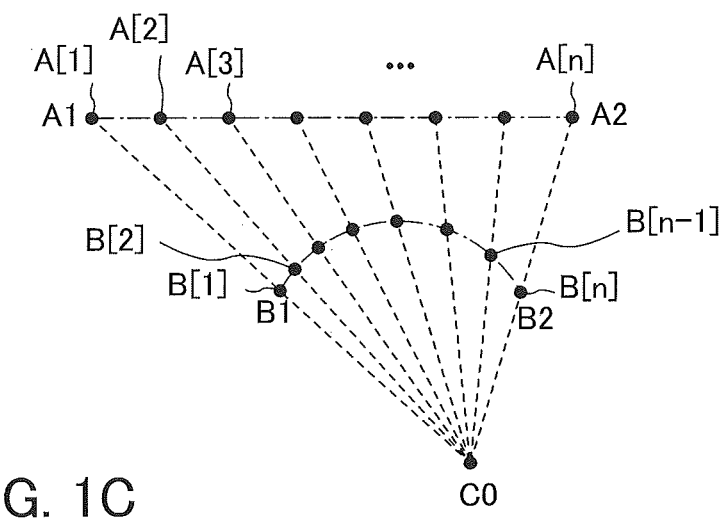

For example, as illustrated in FIG. 1A, the case where image data PINFO that should be visually perceived by a driver positioned at a point C0 is projected on a display device DSP in accordance with the shape of a windshield or an instrument panel is considered. More specifically, as illustrated in FIG. 1B, image data at points A[1] to A[n]

(here, n is an integer greater than or equal to 2) on dashed-dotted line A1-A2 need to be projected on points B[1] to B[n] on dashed-dotted line B1-B2. Note that here, the points A[1] to A[n] on dashed-dotted line. A1-A2 are assumed to be arranged at equal intervals.

At this time, the distance between the point B[1] and the point B[2] is shorter than the distance between the point B[n−1] and the point B[n]. That is, a display region between the point B[1] and the point B[2] is narrower than a display region between the point B[n−1] and the point B[n]. Thus, it is necessary to perform image processing on image data at the points A[1] to A[n] on dashed-dotted line A1-A2 so that image data displayed in the display region between the points B[1] and the point B[2] is spatially compressed more than image data displayed in the display region between the point B[n−1] and the point B[n]. In contrast, the display region between the point B[n-1] and the point B[n] is broader than the display region between the point B[1] and the point B[2]. Thus, it is necessary to perform image processing on the image data at the points A[1] to A[n] on dashed-dotted line A1-A2 so that the image data displayed in the display region between the point B[n−1] and the point B[n] is spatially decompressed more than image data displayed in the display region between the point B[1] and the point B[2].

For example, a method for modulating a clock frequency of a display driver can be given as a method for performing the image processing. Specifically, a method in which a clock frequency of the display driver is reduced to compress image data spatially and a clock frequency of the display driver is increased to decompress image data spatially can be given.

Figure 1C:
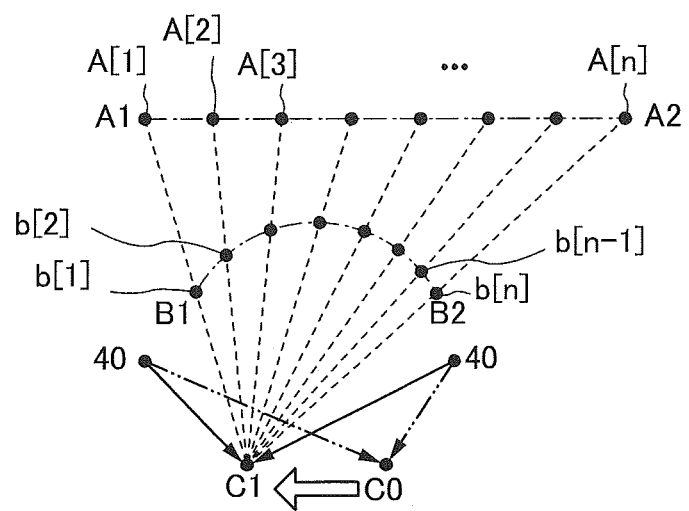

Alternatively, a method that always allows a driver to view a natural image by modulating the clock frequency in accordance with the position of the driver may be employed. For example, in the case where the driver's position is changed from the point C0 to a point C1 as illustrated in FIG. 1C, the image data PINFO that should be visually perceived by the driver positioned at the point C1 needs to be projected on a display device DSP in accordance with the shape of a windshield. In that case, by specifying the position of the driver positioned at the point C1 with one or more image sensors 40, points b[1] to b[n] on dashed-dotted line B1-B2 on which the image data at the points A[1] to A[n] on dashed-dotted line A1-A2 are newly projected can be calculated.

<Operation Example of Display System>

Figure 5:
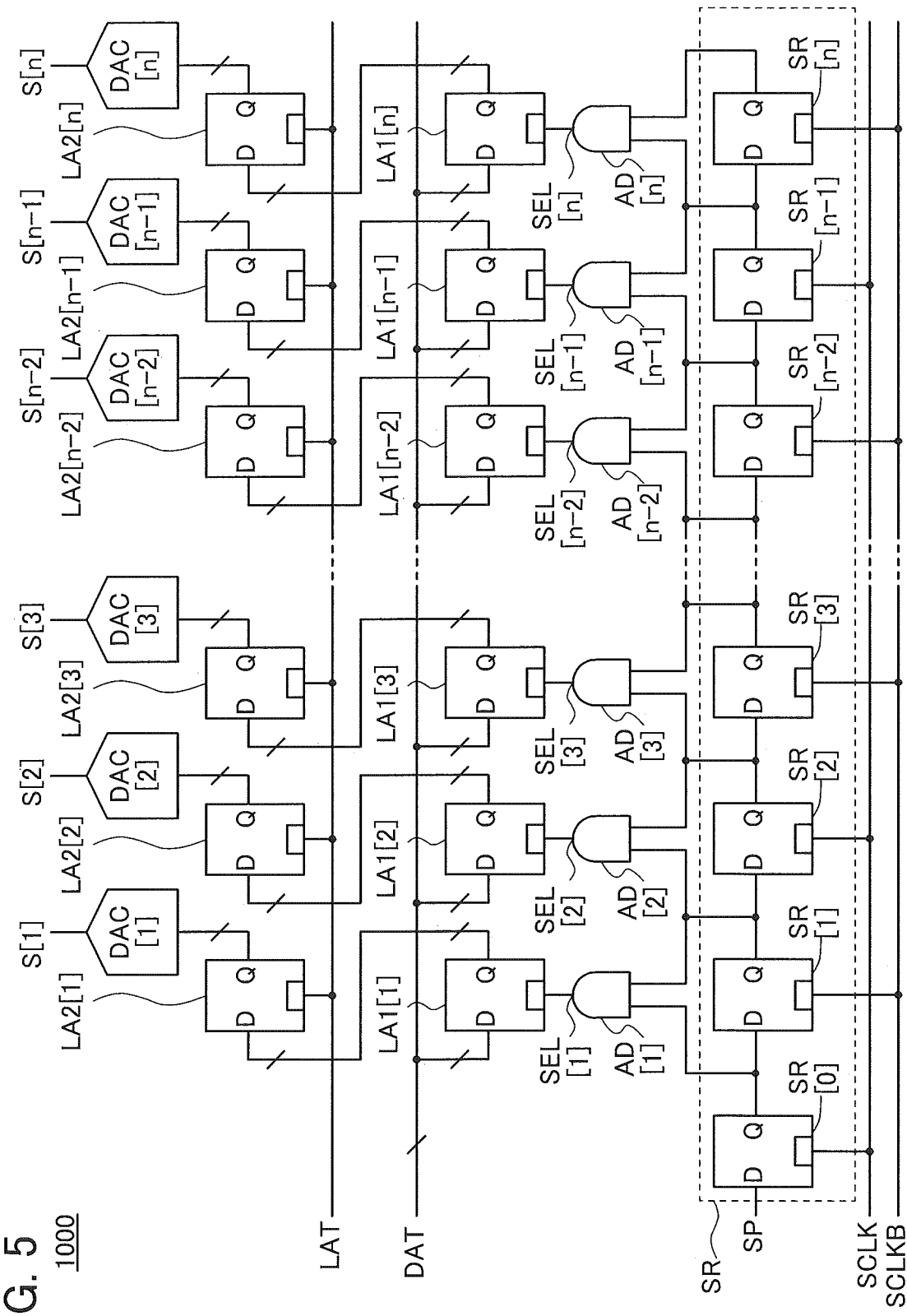
FIG. 5 is a circuit diagram illustrating an example of a display driver.
Figure 6:
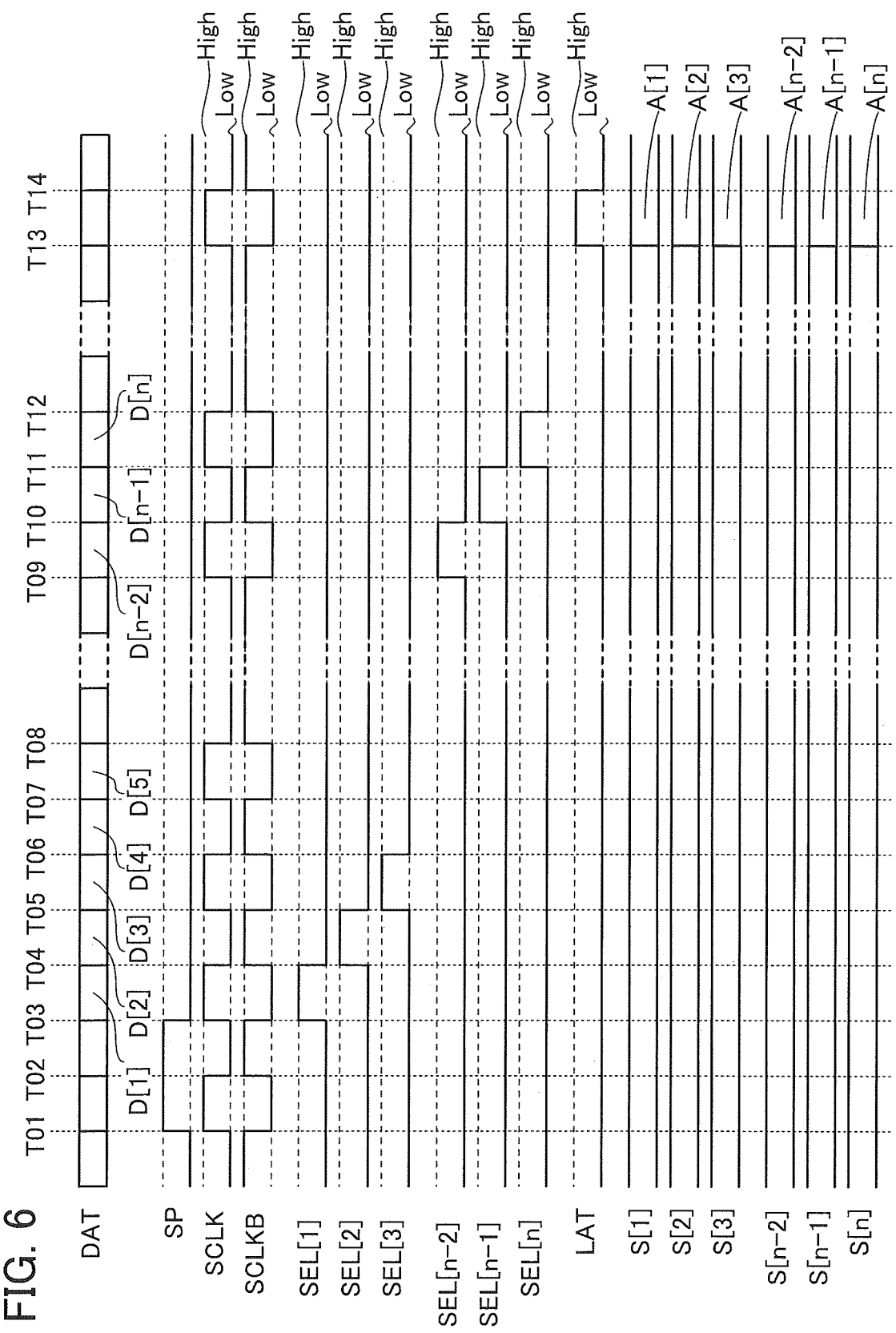
FIG. 6 is a timing chart illustrating an operation example of a display system.
Figure 7:
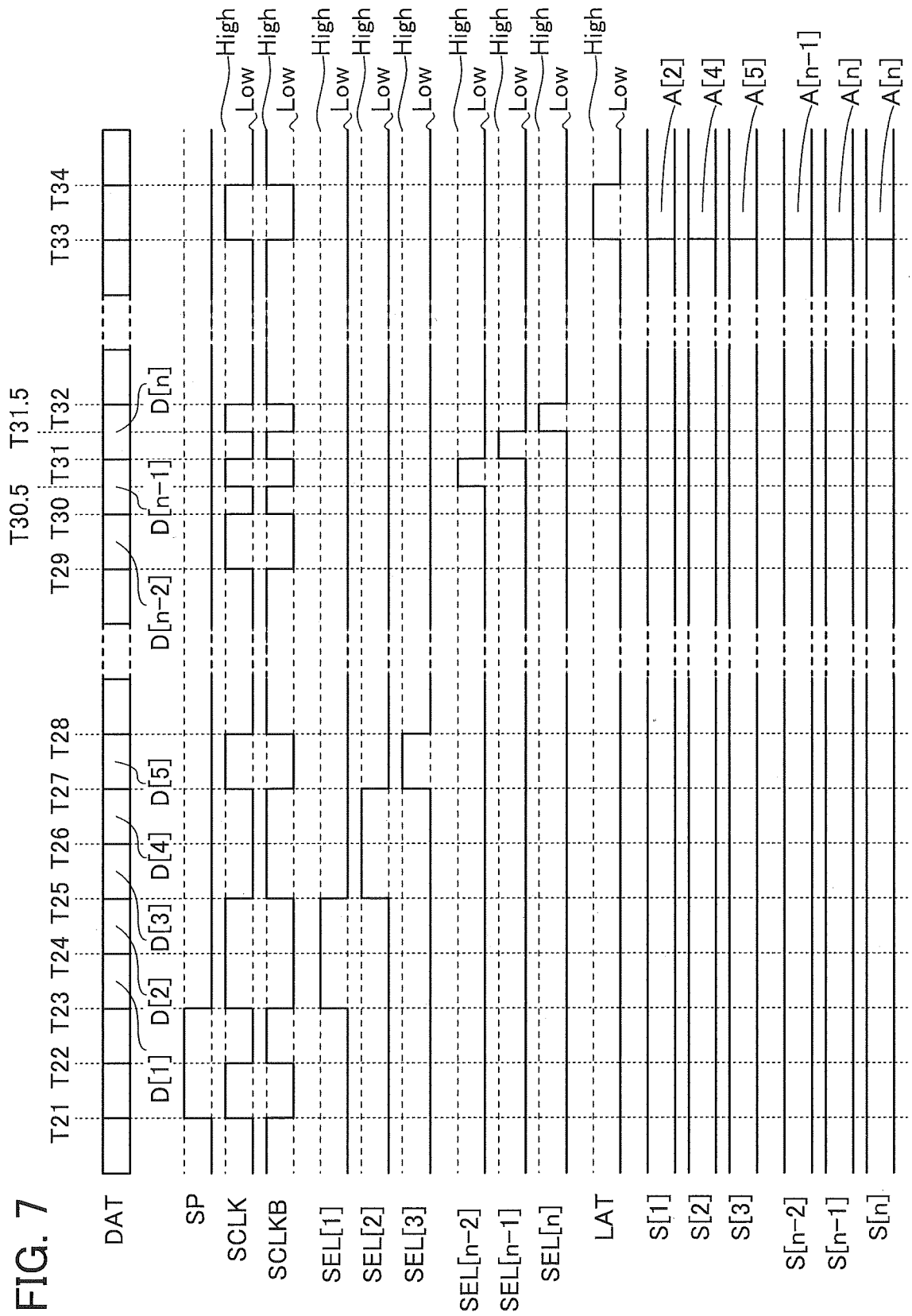
FIG. 7 is a timing chart illustrating an operation example of a display system.

A mode for implementing the method for performing the image processing will be described with reference to FIG. 5, FIG. 6, and FIG. 7. FIG. 5 illustrates a display driver, and FIG. 6 and FIG. 7 are timing charts of the display driver.

A display driver 1000 illustrated in FIG. 5 includes a shift register SR, AND circuits AD[1] to AD[n] (here, n is an integer greater than or equal to 1), latch circuits LA1[1] to LA1 [n], latch circuits LA2[1] to LA2[n], and digital-analog conversion circuits DAC[1] to DAC[n]. Here, the latch circuits LA1[1] to LA1[n] and the latch circuits LA2[1] to LA2[n] retain a plurality of bits of data.

The shift register SR includes latch circuits SR[0] to SR[n]. An input terminal D of the latch circuit SR[0] is electrically connected to a wiring SP. An output terminal Q of the latch circuit SR[j−1] (here, j is an integer greater than or equal to 1 and less than or equal to n) is electrically connected to an input terminal D of the latch circuit SR[j].

A clock input terminal of the latch circuit SR[$h_{even}$] (here, $h_{even}$ is an even integer greater than or equal to 0 and less than or equal to n) is electrically connected to a wiring SCLK, and a clock input terminal of the latch circuit SR[$h_{odd}$] (here, $h_{odd}$ is an odd integer greater than or equal to 1 and less than or equal to n) is electrically connected to a wiring SCLKB. Note that in FIG. 5, n−1 is assumed to be an even number and n is assumed to be an odd number.

A first input terminal of the AND circuit AD[j] is electrically connected to the output terminal Q of the latch circuit SR[j−1], and a second input terminal of the AND circuit AD[j] is electrically connected to an output terminal Q of the latch circuit SR[j]. An output terminal of the AND circuit AD[j] (hereinafter, the output terminal is referred to as a terminal SEL[j]) is electrically connected to a clock input terminal of the latch circuit LA1[j].

An input terminal D of the latch circuit LA1[j] is electrically connected to a wiring DAT. An output terminal Q of the latch circuit LA1[j] is electrically connected to an input terminal D of the latch circuit LA2[j].

A clock input terminal of the latch circuit LA2[j] is electrically connected to a wiring LAT. An output terminal Q of the latch circuit LA2[j] is electrically connected to an input terminal of the digital-analog conversion circuit DAC [j].

An output terminal of the digital-analog conversion circuit DAC[j] is electrically connected to a signal line S[j].

A start signal is input to the input terminal D of the first-stage latch circuit SR[0] of the shift register SR from the wiring SP. In the shift register SR, a start signal retained in the latch circuit of the previous stage is input to an input terminal D of the latch circuit of the subsequent stage in synchronization with clock signals input to the wiring SCLK and the wiring SCLKB. That is, every time clock signals are transmitted from the wiring SCLK and the wiring SCLKB to the shift register SR, an output signal from an output terminal Q of the previous stage is output from an output terminal Q of the subsequent stage. The clock signal of the wiring SCLKB may be an inversion signal of the clock signal of the wiring SCLK or can be a two-phase clock signal of the clock signal of the wiring SCLKB and the clock signal of the wiring SCLK.

In accordance with an output from the shift register SR, image data is retained in any of the latch circuits LA1[1] to LA1[n] of the corresponding stage. Specifically, in the case where a signal "1" is output from each of the adjacent stages in the shift register SR, the signal "1" is input to each of the first input terminal and the second input terminal of the AND circuit; therefore, the signal "1" is input to a clock input terminal of any of the latch circuits LA1[1] to LA1[n] of the corresponding stage. At this timing, image data is retained in the latch circuit LA1 of the corresponding stage by inputting the image data from the wiring DAT. Furthermore, in the case where a signal "1" is input from the wiring LAT, image data retained in each stage of the latch circuits LA1[1] to LA1[n] is input to each input terminal D of the latch circuits LA2[1] to LA2[n]. That is, the image data retained in each stage of the latch circuits LA1[1] to LA1 [n] is retained in the latch circuits LA2[1] to LA2[n]. An output signal from each stage of the latch circuits LA2[1] to LA2[n] is converted into an analog signal by the digital-analog conversion circuits DAC[1] to DAC[n] and is output to each of signal lines S[1] to S[n].

Note that in this specification, the image data transmitted from the wiring DAT is referred to as image data D[1] to D[n]. Each of the image data D[1] to D[n] is assumed to be a plurality of bits of image data.

Note that in FIG. 5, a circuit, a wiring, an element, and reference numeral other than the following are omitted: the display driver 1000, the shift register SR, the wiring SCLK, the wiring SCLKB, the wiring SP, the wiring DAT, the wiring LAT, the AND circuits AD[1], AD[2], AD[3], AD[n−2], AD[n−1], and AD[n], the terminals SEL[1], SEL[2], SEL[3], SEL[n−2], SEL[n−1], and SEL[n], the latch circuits LA1[1], LA1[2], LA1[3], LA1[n−2], LA1[n−1], and LA1[n], the latch circuits LA2[1], LA2[2], LA2[3], LA2[n−2], LA2[n−1], and LA2[n], the input terminal D, the output terminal Q, the digital-analog conversion circuits DAC[1], DAC[2], DAC[3], DAC[n−2], DAC[n−1], and DAC[n], the signal lines S[1], S[2], S[3], S[n−2], S[n−1], and S[n], and the latch circuits SR[0], SR[1], SR[2], SR[3], SR[n−2], SR[n−1], and SR[n].

<<Flat Display>>

FIG. 6 illustrates a timing chart in the case where image data displayed in a display is not spatially modulated. Specifically, the timing chart in FIG. 6 corresponds to the case of a flat display.

The timing chart in FIG. 6 illustrates changes of potentials applied to the wiring SP, the wiring SCLK, the wiring SCLKB, the terminals SEL[1], SEL[2], SEL[3], SEL[n−2], SEL[n−1], and SEL[n], and the wiring LAT. Note that in FIG. 6, a signal "1" (in some cases, also referred to as a high-level potential in this specification) is referred to as High, and a signal "0" (in some cases, also referred to as a low-level potential in this specification) is referred to as Low. The timing chart in FIG. 6 also illustrates data input to the wiring DAT and the signal lines S[1], S[2], S[3], S[n−2], S[n−1], and S[n].

During a period from Time T01 to Time T03, the value of a start signal is assumed to be "1". That is, a potential transmitted from the wiring SP is a high-level potential. During a period from Time 01 to Time T12, clock signals are input from the wiring SCLK and the wiring SCLKB and the clock signals are periodically toggled. Note that the clock signal from the wiring SCLKB is an inversion signal of the clock signal from the wiring SCLK.

Accordingly, during a period from Time T03 to Time T04, the value of a signal output from the terminal SEL[1] becomes "1". At this time, the image data D[1] is input from the wiring DAT and retained in the latch circuit LA1[1].

During a period from Time T04 to Time T05, the value of a signal output from the terminal SEL[2] becomes "1". At this time, the image data D[2] is input from the wiring DAT and retained in the latch circuit LA1[2].

During a period from Time T05 to Time T06, the value of a signal output from the terminal SEL[3] becomes "1". At this time, the image data D[3] is input from the wiring DAT and retained in the latch circuit LA1[3].

During a period from Time T09 to Time T10, the value of a signal output from the terminal SEL[n−2] becomes "1". At this time, the image data D[n−2] is input from the wiring DAT and retained in the latch circuit LA1[n−2].

During a period from Time T06 to Time T09, in a manner similar to that of the period from Time T09 to Time 10, the image data D[4] to D[n−3] are retained in the latch circuits LA1[4] to LA1[n−3].

During a period from Time T10 to Time T11, the value of a signal output from the terminal SEL[n−1] becomes "1". At this time, the image data D[n−1] is input from the wiring DAT and retained in the latch circuit LA1[n−1].

During a period from Time T11 to Time T12, the value of a signal output from the terminal SEL[n] becomes "1". At this time, the image data D[n] is input from the wiring DAT and retained in the latch circuit LA1[n].

During a period from Time T13 to Time T14, a signal "1" is input from the wiring LAT. Accordingly, the image data D[1] to D[n] are retained in the latch circuits LA2[1] to LA2[n]. Then, the image data D[1] to D[n] are converted into analog data A[1] to A[n] by the digital-analog conversion circuits DAC[1] to DAC[n], and the analog data A[1] to A[n] are output to the signal lines S[1] to S[n].

<<Curved Display>>

FIG. 7 illustrates a timing chart in the case where image data displayed in a display is spatially modulated. Specifically, the timing chart in FIG. 7 corresponds to the case of a curved display. Here, as an example, spatially compressed image data is displayed in pixels corresponding to the signal lines S[1] and S[2] (hereinafter referred to as a first display region), image data displayed in the flat display is displayed in pixels corresponding to the signal lines S[3] to S[n−3] (hereinafter referred to as a second display region), and spatially decompressed image data is displayed in pixels corresponding to the signal lines S[n−2] to S[n] (hereinafter referred to as a third display region).

The description of the timing chart in FIG. 6 is referred to for the wirings, High, Low, and the like in the timing chart in FIG. 7.

Note that image data transmitted to the wiring DAT in the tuning chart in FIG. 7 are the same as the image data transmitted to the wiring DAT in the timing chart in FIG. 6. That is, arithmetic processing performed by an image processing circuit or a GPU in the timing chart in FIG. 7 is not different from that in the timing chart in FIG. 6. Thus, in the case where the form of a display is changed, the arithmetic processing performed by an image processing circuit or a GPU can be skipped entirely or partly by operating the display driver in the following manner.

During a period from Time T21 to Time T23, the value of a start signal is assumed to be "1". That is, a potential transmitted from the wiring SP is a high-level potential. During a period from Time T21 to Time T32, clock signals are input from the wiring SCLK and the wiring SCLKB and the clock signals are periodically toggled. Note that the clock signal from the wiring SCLKB is an inversion signal of the clock signal from the wiring SCLK.

Note that the toggle cycle during a period from Time T23 to Time T27 is twice the toggle cycle during a period from Time T27 to Time T30. In addition, the toggle cycle during a period from Time T30 to Time T32 is half the toggle cycle during a period from Time T27 to Time T30.

Accordingly, during a period from Time T23 to Time T25, the value of a signal output from the terminal SEL[1] becomes "1". At this time, the image data D[1] and D[2] are input from the wiring DAT; however, only the image data D[2] which is input later is retained in the latch circuit LA1[1].

Accordingly, during a period from Time T25 to Time T27, the value of a signal output from the terminal SEL[2] becomes "1". At this time, the image data D[3] and D[4] are input from the wiring DAT; however, only the image data D[4] which is input later is retained in the latch circuit LA1[2].

During a period from Time T27 to Time T28, the value of a signal output from the terminal SEL[3] becomes "1". At this time, the image data D[5] is input from the wiring DAT and retained in the latch circuit LA1[3].

During a period from Time T28 to Time T30, in a manner similar to that of the period from Time T27 to Time 28, the image data D[6] to D[n−2] are retained in the latch circuits LA1[4] to LA1[n−4].

During a period from Time T30 to Time T30.5, the value of a signal output from the terminal SEL[n−3] becomes "1".

At this time, the image data D[n−1] is input from the wiring DAT and retained in the latch circuit LA1[n−3] (not illustrated).

During a period from Time T30.5 to Time T31, the value of a signal output from the terminal SEL[n−2] becomes "1". At this time, the image data D[n−1] is input from the wiring DAT and retained in the latch circuit LA1[n−2].

During a period from Time T31 to Time T31.5, the value of a signal output from the terminal SEL[n−1] becomes "1". At this time, the image data D[n] is input from the wiring DAT and retained in the latch circuit LA1[n−1].

During a period from Time T31.5 to Time T32, the value of a signal output from the terminal SEL[n] becomes "1". At this time, the image data D[n] is input from the wiring DAT and retained in the latch circuit LA1[n].

During a period from Time T33 to Time T34, a signal "1" is input from the wiring LAT. Accordingly, the image data D[2], D[4], D[5] to D[n−1], D[n−1], D[n], and D[n] are retained in the latch circuits LA2[1] to LA2[n]. Then, the image data D[2], D[4], D[5] to D[n−1], D[n−1], D[n], and D[n] are converted into analog data A[2], A[4], A[5] to A[n−2], A[n−1], A[n−1], A[n], and A[n] by the digital-analog conversion circuits DAC[1] to DAC[n], and the analog data A[2], A[4], A[5] to A[n−2], A[n−1], A[n−1], A[n], and A[n] are output to the signal lines S[1] to S[n].

Accordingly, image data transmitted to the display driver, which are thinned out, are input to the pixels corresponding to the signal lines S[1] and S[2]. This corresponds to an output of the spatially compressed image data to the first display region. In addition, the image data transmitted to the display driver are input to the pixels corresponding to the signal lines S[3] and S[n−3] without being thinned out or decompressed. This corresponds to an output of the image data displayed in the flat display to the second display region. Furthermore, the overlapped image data transmitted to the display driver are input to the pixels corresponding to the signal lines S[n−2] to S[n]. This corresponds to an output of the spatially decompressed image data to the third display region.

By modulating the clock frequency of a display driver, the image processing can be performed in accordance with spatial modulation of image data.

Note that one embodiment of the present invention is not limited to the above operation example. In the case where the form of a display is complex, a display region can be divided into more regions than the first to third display regions and the clock frequency can be modulated more precisely in each display region.

In the case of a display device having a complex shape such as a curved surface, a natural image cannot be displayed precisely in some cases depending on the driver's position. In that case, as described in FIG. 1C, a plurality of image sensors may be provided so that the driver's position can be specified. After the driver's position is specified by the plurality of image sensors, the clock frequency of the display driver can be modulated appropriately on the basis of the positional data.

<Modulation Method of Clock Frequency>

Here, a device for generating or modulating a clock signal which is used in a system of one embodiment of the present invention will be described.

Figure 8:
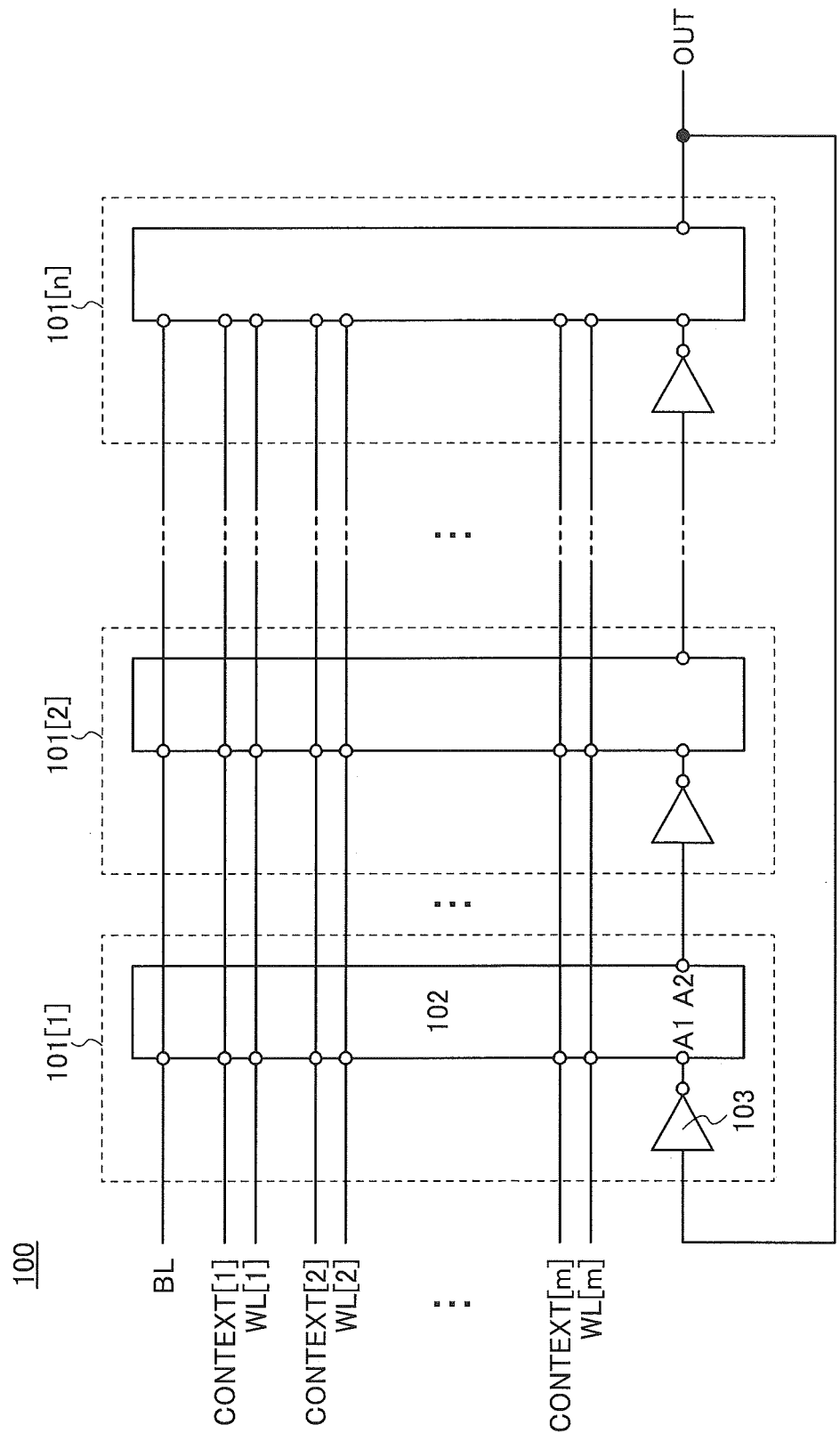
FIG. 8 is a block diagram illustrating an example of a device for generating a clock signal.

FIG. 8 illustrates a device for generating or modulating a clock signal. A device 100 has a function of generating an alternating-current signal such as a clock signal, and may be referred to as an oscillator (or an oscillator circuit). Specifically, the device 100 has a function of changing the frequency (or oscillation frequency) of a signal on the basis of input voltage, and may be referred to as a voltage-controlled oscillator (or a voltage-controlled oscillator circuit).

The device 100 includes circuits 101[1] to 101[n] (here, n is an odd number greater than or equal to 3). The circuits 101[1] to 101[n] are connected in a ring configuration. Specifically, an output terminal of each of the circuits 101[1] to 101[n−1] is connected to an input terminal of the circuit of the subsequent stage. An output terminal of the circuit 101[n] is connected to an input terminal of the circuit 101[1]. The output terminal of the circuit 101[n] is connected to a terminal OUT. A signal generated by oscillation of the device 100 is output from the terminal OUT.

Note that in the display system of one embodiment of the present invention, a clock signal can be supplied to the display driver 1000 by connecting the terminal OUT to the wiring SCLK or the wiring SCLKB of the display driver 1000. The signal generated by the device 100 and output from the terminal OUT may be output through a buffer or the like.

Each of the circuits 101[1] to 101[n] has a function of outputting an inverted signal of an input signal. In addition, each of the circuits 101[1] to 101[n] has a function of storing a plurality of sets of data and has a function of setting delay time on the basis of the plurality of sets of data stored. The delay time refers to delay time of an output signal with respect to an input signal. Each of the circuits 101[1] to 101[n] can change delay time owing to its capability of storing a plurality of sets of data.

That is, the device 100 can change the oscillation frequency by changing the delay time of each of the circuits 101[1] to 101 [n].

Each of the circuits 101[1] to 101 [n] includes a circuit 102 and an inverter 103. A terminal A1 of the circuit 102 is connected to an output terminal of the inverter 103, and a terminal A2 of the circuit 102 is connected to an input terminal of the inverter 103 of the subsequent stage. That is, n inverters 103 are connected in a ring configuration, constituting an inverter ring. The circuit 102 is connected between one inverter 103 and another. The circuit 102 is also connected to a wiring BL, wirings CONTEXT[1] to CONTEXT[m] (m is a natural number greater than or equal to 2), and wirings WL[1] to WL[m].

Note that the circuit 102 may be connected between at least two of the n inverters 103.

The circuit 102 has a function of storing a plurality of sets of data and has a function of setting a resistance between the terminal A1 and the terminal A2 on the basis of the plurality of sets of data stored. The circuit 102 can change the resistance between the terminal A1 and the terminal A2 owing to its capability of storing a plurality of sets of data.

The inverter 103 has a function of outputting an inverted signal of an input signal.

Note that instead of the inverter 103, a circuit having a function of outputting an inverted signal of an input signal may be employed. Examples of such a circuit include a NAND circuit, a NOR circuit, and the like.

The device 100 can change the oscillation frequency by changing the resistance between the terminal A1 and the terminal A2 of the circuit 102 in each of the circuits 101[1] to 101[n]. Specifically, when the resistance between the terminal A1 and the terminal A2 of the circuit 102 changes, the load on the inverter 103 changes. Accordingly, the delay time of each of the circuits 101[1] to 101 [n] changes; therefore, the oscillation frequency also changes.

A specific example of the circuit 102 will be described with reference to FIG. 9.

Figure 9:
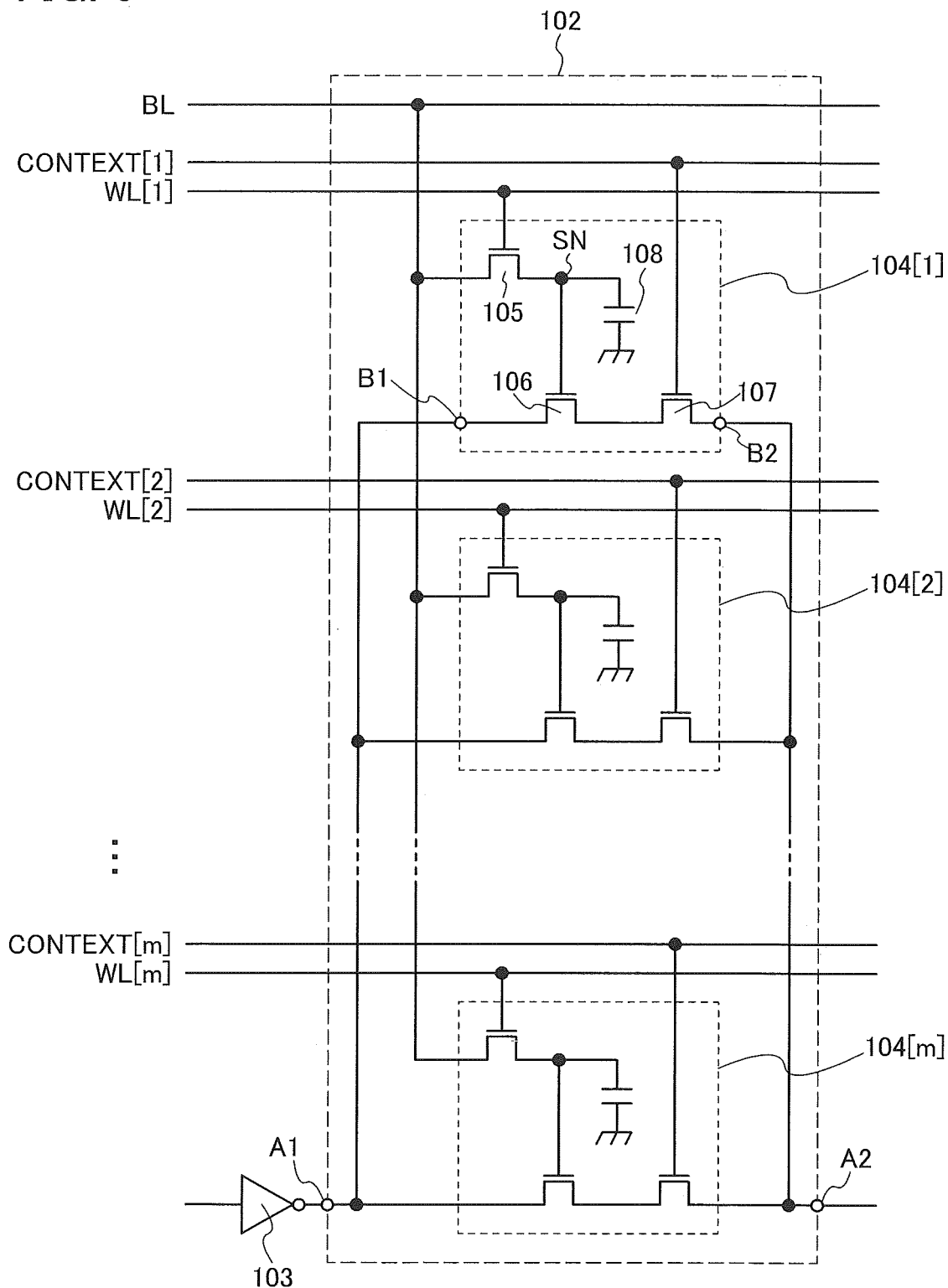
FIG. 9 is a circuit diagram illustrating an example of a device for generating a clock signal.

The circuit 102 illustrated in FIG. 9 includes data retention circuits 104[1] to 104[m]. Each of the data retention circuits 104[1] to 104[m] includes a terminal B1 and a terminal B2, each terminal B1 is connected to the terminal A1 of the circuit 102, and each terminal B2 is connected to the terminal A2 of the circuit 102. Furthermore, the data retention circuits 104[1] to 104[m] are each connected to the wiring BL, corresponding one of the wirings CONTEXT[1] to CONTEXT[m], and corresponding one of the wirings WL[1] to WL[m]. In the data retention circuit 104[j] (here, j is an integer of one of 1 to m), the corresponding one of the wirings WL[1] to WL[m] refers to the wiring WL[j]. In the data retention circuit 104[j], the corresponding one of the wirings CONTEXT[1] to CONTEXT[m] refers to the wiring CONTEXT[j].

Each of the data retention circuits 104[1] to 104[m] includes a transistor 105, a transistor 106, a transistor 107, and a capacitor 108. A first terminal of the transistor 105 is connected to the wiring BL, a second terminal of the transistor 105 is connected to a gate of the transistor 106, and a gate of the transistor 105 is connected to the corresponding one of the wirings WL[1] to WL[m]. A first terminal of the transistor 106 is connected to the terminal B1. A first terminal of the transistor 107 is connected to a second terminal of the transistor 106, a second terminal of the transistor 107 is connected to the terminal B2, and a gate of the transistor 107 is connected to the corresponding one of the wirings CONTEXT[1] to CONTEXT[m]. A first terminal of the capacitor 108 is connected to the gate of the transistor 106, and a second terminal of the capacitor 108 is connected to a wiring to which a predetermined potential is supplied.

Note that it is acceptable as long as the transistor 106 and the transistor 107 are connected in series between the terminal B1 and the terminal B2, and the transistor 106 and the transistor 107 may be exchanged.

The resistance between the terminal A1 and the terminal A2 of the circuit 102 is substantially equal to the combined resistance of resistances between the terminals B1 and the terminals B2 of the data retention circuits 104[1] to 104[m]. Therefore, the resistance between the terminal A1 and the terminal A2 of the circuit 102 can be changed by controlling the resistances between the terminals B1 and the terminals B2 of the data retention circuits 104[1] to 104[m].

Each of the data retention circuits 104[1] to 104[m] has a function of storing a potential at a node SN and setting a resistance between the first terminal and the second terminal of the transistor 106 on the basis of the potential. The potential can be stored at the node SN by turning on the transistor 105 so that the potential of the wiring BL is input to the node SN and charge based on the potential of the wiring BL is accumulated in the capacitor 108. Each of the data retention circuits 104[1] to 104[m] can also store an analog potential at the node SN. Thus, the data retention circuits 104[1] to 104[m] can store different potentials at the nodes SN and have different resistances between the first terminal and the second terminal of the transistors 106. In the case where the transistor 106 is an n-channel transistor, as the potential of the node SN increases, the resistance between the first terminal and the second terminal of the transistor 106 decreases. In the case where the transistor 106 is a p-channel transistor, as the potential of the node SN decreases, the resistance between the first terminal and the second terminal of the transistor 106 decreases.

As the transistor 105, a transistor including an oxide semiconductor in a channel formation region is preferably employed. As will be described later, the off-state current of the transistor including an oxide semiconductor in a channel formation region is small, and therefore, charge leakage from the capacitor 108 can be reduced. In the case where charge based on the analog potential is accumulated in the capacitor 108, the effect of employing the transistor including an oxide semiconductor in a channel formation region as the transistor 105 is particularly significant.

Note that the potential stored at the node SN is preferably a potential at which the transistor 106 is turned on. Thus, the resistance between the first terminal and the second terminal of the transistor 106 can also be referred to as on-state resistance of the transistor 106.

Note that the capacitor 108 may be omitted in the case where charge based on the potential of the wiring BL can be accumulated in parasitic capacitance at the node SN such as gate capacitance of the transistor 106.

Each of the data retention circuits 104[1] to 104[m] has a function of switching between electrically connecting the terminal B1 and the terminal B2 to each other and electrically disconnecting the terminal B1 and the terminal B2 from each other. Electrically connecting the terminal B1 and the terminal B2 to each other and electrically disconnecting the terminal B1 and the terminal B2 from each other can be switched by turning on or off the transistor 107. When the transistor 107 is on, the terminal B1 and the terminal B2 are electrically connected to each other, and thus, the resistance between the terminal B1 and the terminal B2 depends on the resistance between the first terminal and the second terminal of the transistor 106. Specifically, the resistance between the terminal B1 and the terminal B2 is substantially equal to the sum of the resistance between the first terminal and the second terminal of the transistor 106 and the resistance between the first terminal and the second terminal of the transistor 107 in an on state. On the other hand, when the transistor 107 is off, the terminal B1 and the terminal B2 are electrically disconnected from each other, and thus, the terminal B1 and the terminal B2 have high impedance regardless of the resistance between the first terminal and the second terminal of the transistor 106.

Each of the data retention circuits 104[1] to 104[m] has a function of switching between electrically disconnecting the terminal B1 and the terminal B2 from each other and setting the resistance between the terminal B1 and the terminal B2 to a value based on stored data.

The resistance between the terminal A1 and the terminal A2 of the circuit 102 can be changed by a variety of methods.

The resistance between the terminal A1 and the terminal A2 of the circuit 102 can be changed by selecting one or more circuits in each of which the terminal B1 and the terminal B2 are to be electrically connected to each other from the data retention circuits 104[1] to 104[m] and controlling the number thereof. In the case where the data retention circuits 104[1] to 104[m] store the same data, the data retention circuits 104[1] to 104[m] have the same resistance between the first terminals and the second terminals of the transistors 106. Therefore, the resistance between the terminal A1 and the terminal A2 of the circuit 102 can be controlled by controlling the number of circuits in each of which the terminal B1 and the terminal B2 are electrically connected to each other among the data retention circuits 104[1] to 104[m].

Specifically, during the period from Time T23 to Time T27 in FIG. 7, a first clock signal is generated in such a manner that $K_1$ circuits ($K_1$ is an integer greater than or equal to 3 and less than or equal to m) are selected from the data retention circuits 104[1] to 104[m] and the resistance between the terminal A1 and the terminal A2 is set to a first resistance. In addition, during the period from Time T27 to Time T30 in FIG. 7, a second clock signal is generated in such a manner that $K_2$ circuits ($K_2$ is an integer greater than or equal to 2 and less than or equal to m, which is less than $K_1$) are selected from the data retention circuits 104[1] to 104[m] and the resistance between the terminal A1 and the terminal A2 is set to a second resistance. Furthermore, during the period from Time T30 to Time T32 in FIG. 7, a third clock signal is generated in such a manner that $K_3$ circuits ($K_3$ is an integer greater than or equal to 1 and less than or equal to m, which is less than $K_2$) are selected from the data retention circuits 104[1] to 104[m] and the resistance between the terminal A1 and the terminal A2 is set to a third resistance. Note that since the $K_1$ circuits are larger in number than the $K_2$ circuits and the $K_2$ circuits are larger in number than the $K_3$ circuits, the first resistance is higher than the second resistance and the second resistance is higher than the third resistance. Thus, as the resistance between the terminal A1 and the terminal A2 increases, an output signal is delayed with respect to an input signal; therefore, the frequency of the first clock signal becomes lower than the frequency of the second clock signal, and the frequency of the second clock signal becomes lower than the frequency of the third clock signal.

The resistance between the terminal A1 and the terminal A2 of the circuit 102 can be changed on the basis of data stored in a circuit in which the terminal B1 and the terminal B2 are to be electrically connected to each other, which is selected from the data retention circuits 104[1] to 104[m]. In the case where the data retention circuits 104[1] to 104[m] store different data, the data retention circuits 104[1] to 104[m] have different resistances between the first terminals and the second terminals of the transistors 106. Therefore, the resistance between the terminal A1 and the terminal A2 of the circuit 102 can be controlled by which of the data retention circuits 104[1] to 104[m] is selected.

Specifically, during the period from Time T23 to Time T27 in FIG. 7, a clock signal $CLk_1$ is generated in such a manner that the data retention circuit 104[$k_1$] ($k_1$ is an integer greater than or equal to 1 and less than or equal to m) is selected from the data retention circuits 104[1] to 104[m] and the resistance between the terminal A1 and the terminal A2 is set to a resistance $Rk_1$. In addition, during the period from Time T27 to Time T30 in FIG. 7, a clock signal $CLk_2$ is generated in such a manner that the data retention circuit 104[$k_2$] ($k_2$ is an integer greater than or equal to 1 and less than or equal to m, which is not $k_1$) is selected from the data retention circuits 104[1] to 104[m] and the resistance between the terminal A1 and the terminal A2 is set to a resistance $Rk_2$. Furthermore, during the period from Time T30 to Time T32 in FIG. 7, a clock signal $CLk_3$ is generated in such a manner that the data retention circuit 104[$k_3$] ($k_3$ is an integer greater than or equal to 1 and less than or equal to m, which is not $k_1$ and $k_2$) is selected from the data retention circuits 104[1] to 104[m] and the resistance between the terminal A1 and the terminal A2 is set to a resistance $Rk_3$. The resistance between the terminal B1 and the terminal B2 of the data retention circuit 104[$k_1$] is assumed to be higher than the resistance between the terminal B1 and the terminal B2 of the data retention circuit 104[$k_2$], and the resistance between the terminal B1 and the terminal B2 of the data retention circuit 104[$k_2$] is assumed to be higher than the resistance between the terminal B1 and the terminal B2 of the data retention circuit 104[$k_3$]. Therefore, the resistance $Rk_1$ is higher than the resistance $Rk_2$, and the resistance $Rk_2$ is higher than the resistance $Rk_3$. Thus, as the resistance between the terminal A1 and the terminal A2 increases, an output signal is delayed with respect to an input signal; therefore, the frequency of the clock signal $CLk_1$ becomes lower than the frequency of the clock signal $CLk_2$, and the frequency of the clock signal $CLk_2$ becomes lower than the frequency of the clock signal $CLk_3$.

Note that the two aforementioned examples may be combined as appropriate. That is, different data may be stored in at least two of the data retention circuits 104[1] to 104[m], and the resistance between the terminal A1 and the terminal A2 of the circuit 102 may be changed by selecting one or more circuits in each of which the terminal B1 and the terminal B2 are to be electrically connected to each other from the data retention circuits 104[1] to 104[m].

Specifically, during the period from Time T23 to Time T27 in FIG. 7, a clock signal $CLW_1$ is generated in such a manner that any of the data retention circuits 104[1] to 104[m] is selected by a first selection method and the resistance between the terminal A1 and the terminal A2 is set to a resistance $RW_1$. In addition, during the period from Time T27 to Time T30 in FIG. 7, a clock signal $CLW_2$ is generated in such a manner that any of the data retention circuits 104[1] to 104[m] is selected by a second selection method and the resistance between the terminal A1 and the terminal A2 is set to a resistance $RW_2$. Furthermore, during the period from Time T30 to Time T32 in FIG. 7, a clock signal $CLW_3$ is generated in such a manner that any of the data retention circuits 104[1] to 104[m] is selected by a third selection method and the resistance between the terminal A1 and the terminal A2 is set to a resistance $RW_3$. The resistance $RW_1$ is assumed to be higher than the resistance $RW_2$, and the resistance $RW_2$ is assumed to be higher than the resistance $RW_3$. Thus, as the resistance between the terminal A1 and the terminal A2 increases, an output signal is delayed with respect to an input signal; therefore, the frequency of the clock signal $CLW_1$ becomes lower than the frequency of the clock signal $CLW_2$, and the frequency of the clock signal $CLW_2$ becomes lower than the frequency of the clock signal $CLW_3$.

A clock signal used in the display system of one embodiment of the present invention can be generated by using the device 100 as described above. A clock signal having low frequency can be generated by increasing the resistance between the terminal A1 and the terminal A2 of the circuit 102, and a clock signal having high frequency can be generated by reducing the resistance between the terminal A1 and the terminal A2 of the circuit 102.

<Structure Example of Pixel in Display Panel>

In this section, a configuration example of a pixel in a display panel which can be used in the above display system will be described.

Figure 10A:
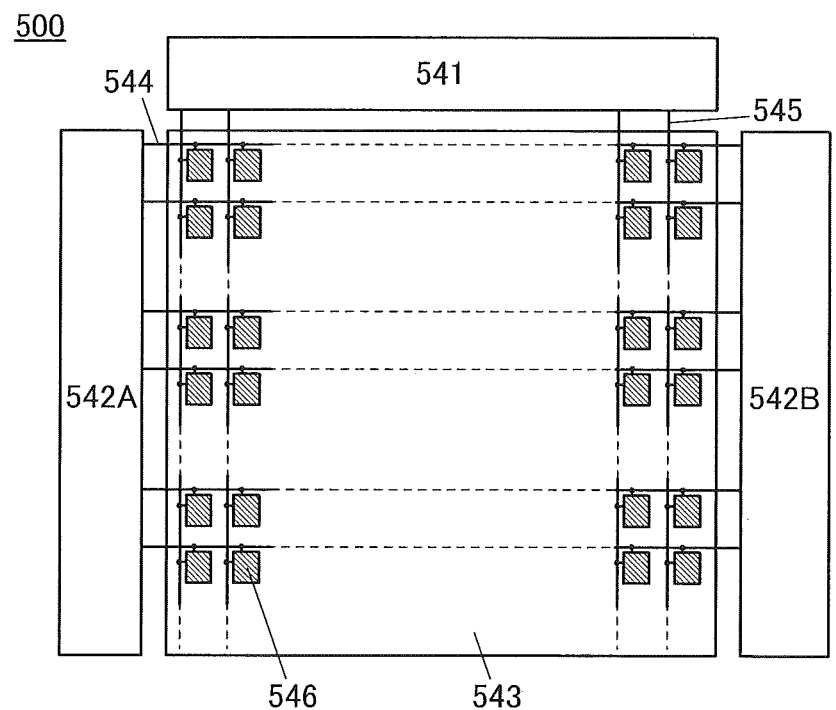
FIGS. 10A and 10B illustrate a configuration example of a pixel in a display panel.

FIG. 10A is a block diagram showing a structure example of the display panel.

A display panel 500 in FIG. 10A includes a driver circuit 541, a driver circuit 542A, a driver circuit 542B, and a pixel portion 543. Note that the driver circuits 541, 542A, and 542B are collectively referred to as a driver circuit or a peripheral driver circuit in some cases.

The driver circuits 542A and 542B can function as, for example, scan line driver circuits. The driver circuit 541 can function as, for example, a signal line driver circuit. Note that one of the driver circuits 542A and 542B may be omitted. Alternatively, some sort of circuit facing the driver circuit 541 with the pixel portion 543 provided therebetween may be provided.

The display panel 500 illustrated as an example in FIG. 10A includes p wirings 544 whose potentials are controlled by the driver circuit 542A and/or the driver circuit 542B, and q wirings 545 whose potentials are controlled by the driver circuit 541 (p and q are each an integer of 1 or more). Note that the p wirings 544 are arranged substantially parallel to each other, and the q wirings 545 are arranged substantially parallel to each other. The pixel portion 543 includes a plurality of pixels 546 arranged in a matrix. The pixel 546 includes a pixel circuit and a display element.

When every three pixels 546 function as one pixel, full-color display can be provided. Each of the three pixels 546 controls the transmittance, reflectance, amount of emitted light, or the like for emitting red light, green light, or blue light. The light colors controlled by the three pixels 546 are not limited to the combination of red, green, and blue, and may be yellow, cyan, and magenta.

A pixel 546 that controls white light may be added to the pixels controlling red light, green light, and blue light so that the four pixels 546 will collectively function as one pixel. The addition of the pixel 546 that controls white light can heighten the luminance of the display region. When the number of the pixels 546 functioning as one pixel is increased to use red, green, blue, yellow, cyan, and magenta in appropriate combination, the range of color reproduction can be widened.

A wiring 544_g in a g-th row (g is a natural number greater than or equal to 1 and less than or equal to p) is electrically connected to q pixels 546 in the g-th row among the plurality of pixels 546 arranged in p rows and q columns in the pixel portion 543. A wiring 545_h on the h-th column (h is a natural number greater than or equal to 1 and less than or equal to q) is electrically connected to p pixels 546 on the h-th column among the plurality of pixels 546 arranged in p rows and q columns.

The display panel 500 can employ various modes and include various display elements Examples of the display elements are elements including a display medium whose luminance or the like is changed by electric action, such as an electroluminescent (EL) element (e.g., an organic EL element, an inorganic EL element, and an EL element containing organic and inorganic materials).

Figure 10B:
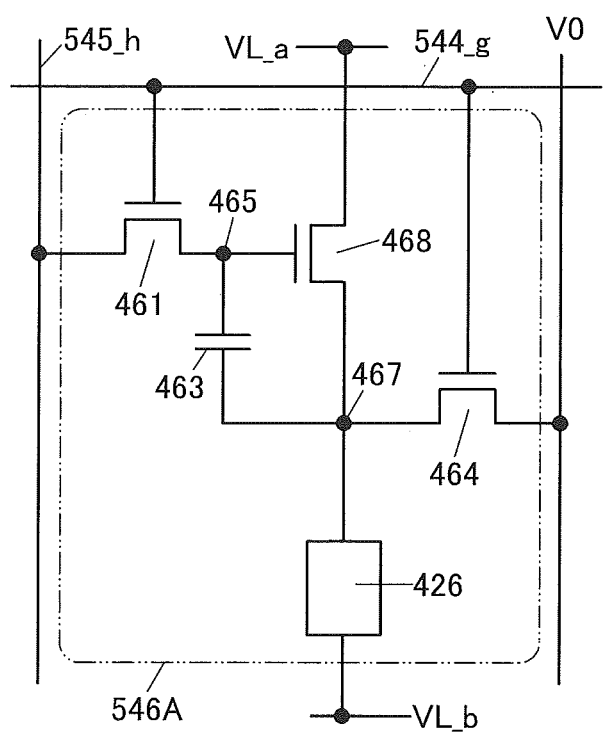

A pixel 546A in FIG. 10B includes a transistor 461, a capacitor 463, a transistor 468, a transistor 464, and a light-emitting element 426 capable of functioning as a display element.

One of a source and a drain of the transistor 461 is electrically connected to the wiring 545_h. A gate of the transistor 461 is electrically connected to the wiring 544_g. The wiring 545_h applies a video signal.

The transistor 461 has a function of controlling writing of a video signal to a node 465.

One of a pair of electrodes of the capacitor 463 is electrically connected to the node 465, and the other is electrically connected to a node 467. The other of the source and the drain of the transistor 461 is electrically connected to the node 465.

The capacitor 463 functions as a storage capacitor for storing data written to the node 465.

One of a source and a drain of the transistor 468 is electrically connected to a potential supply line VL_a, and the other is electrically connected to the node 467. A gate of the transistor 468 is electrically connected to the node 465.

One of a source and a drain of the transistor 464 is electrically connected to a wiring VO, and the other is electrically connected to the node 467. A gate of the transistor 464 is electrically connected to the wiring 544_g.

One of an anode and a cathode of the light-emitting element 426 is electrically connected to a potential supply line VL_b, and the other is electrically connected to the node 467.

As the light-emitting element 426, an organic electroluminescent element (also referred to as an organic EL element) or the like can be used, for example. Note that the light-emitting element 426 is not limited thereto; an inorganic EL element including an inorganic material can be used, for example.

A high power supply potential VDD is applied to one of the potential supply line VL_a and the potential supply line VL_b, and a low power supply potential VSS is applied to the other, for example.

In the display panel 500 including the pixel 546A in FIG. 10B, the pixels 546 are sequentially selected row by row by the driver circuit 542A and/or the driver circuit 542B, so that the transistor 461 is turned on and a video signal is written to the node 465.

The pixel 546A in which the data has been written to the node 465 is brought into a holding state when the transistor 461 and the transistor 464 are turned off. The amount of current flowing between the source and the drain of the transistor 468 is controlled on the basis of the potential of the data written to the node 465. The light-emitting element 426 emits light with a luminance determined by the amount of flowing current. This operation is sequentially performed row by row; thus, an image can be displayed.

The transistor 461, the transistor 464, and the transistor 468 may be transistors with back gates. In that case, in each of the transistor 461, the transistor 464, and the transistor 468, the gate may be electrically connected to the back gate.

The above transistor 461, the transistor 464, and the transistor 468 are preferably OS transistors. As described above, the off-state current of OS transistors is extremely low. Therefore, OS transistors can continue storing the potential of data written once to the node 465. When the same image is displayed, the refresh rate, a frequency of data writing, can be reduced; thus, the power consumption can be reduced.

In addition, OS transistors can be formed at temperatures lower than that in the case of transistors in which their channel formation regions are formed using low-temperature polysilicon (LTPS). Thus, the upper temperature limit of the base for forming the OS transistors can be lowered, which allows a range of selecting the materials to be broadened. In particular, a several-µm-thick base can be selected as a base layer of a resin such as polyimide; therefore, the display panel can be lighter and thinner. In addition, the display panel can be easily bent.

The organic EL element used as the light-emitting element 426 has a preferable response speed at low temperatures as compared to liquid crystal elements. The display panels are used in a wide range of ambient temperatures when being used for automobiles. Even in such a case, the display panel in which organic EL elements are used as the light-emitting elements can suppress reduction in the display quality.

In addition, the display panel in which organic EL elements are used as the light-emitting elements has little change in the luminance due to a difference of the viewpoint positions as compared to a display panel using liquid crystal elements. That is, the viewing angle dependence is small. When the display panels are used for automobiles, information of the meter or the like can be correctly displayed without blur.

<Example of using Display System for Moving Object>

A display panel capable of being used for the above display system is attachable to a surface so as to fit the shape of the surface. Examples in which the display panel is used for the periphery of a driver's seat in an automobile, which is a moving object, will be described below.

Figure 11:
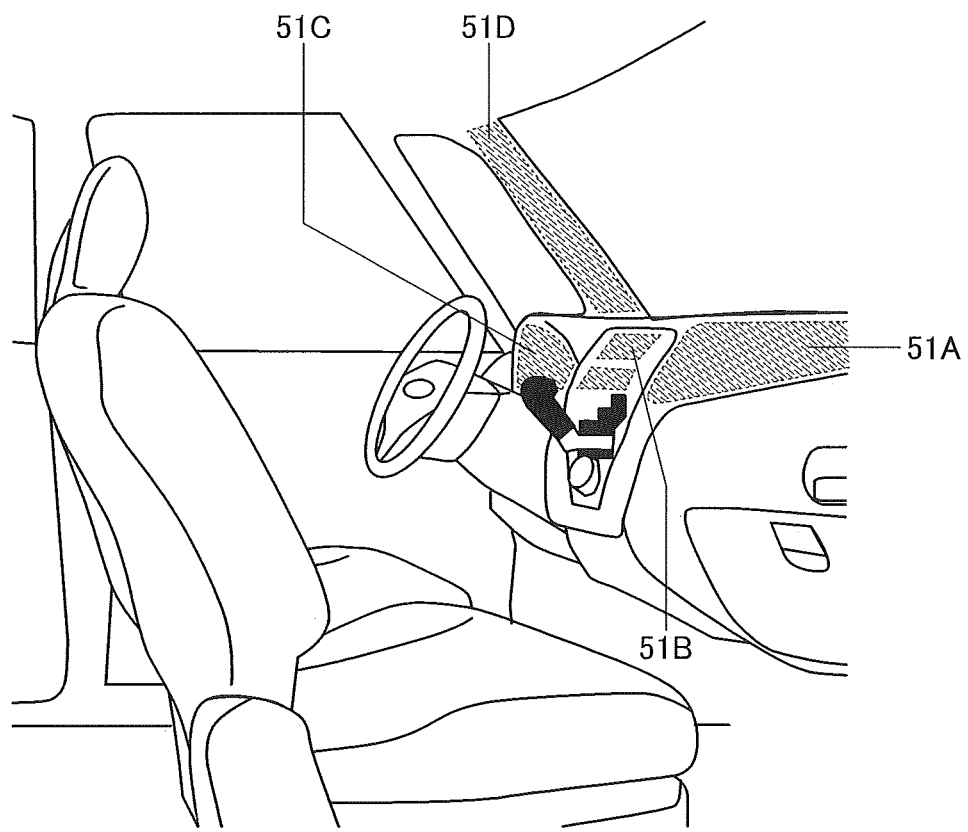
FIG. 11 illustrates a structure of display panels in a moving object.

FIG. 11 illustrates a windshield and its vicinity inside an automobile, for example. In FIG. 11, a display panel 51A, a display panel 51B, and a display panel 51C which are attached to a dashboard and a display panel 51D which is attached to a pillar are illustrated.

The display panels 51A to 51C can provide a variety of kinds of information such as navigation data, a speedometer, a tachometer, a mileage, a fuel meter, a gearshift indicator, and air-condition setting. The content, layout, or the like of the display on the display panels can be changed freely to suit the user's preferences, so that the design can be improved. The display panels 51A to 51C can also be used as lighting devices.

The display panel 51D can compensate for the view hindered by the pillar (blind areas) by displaying an image taken by an imaging unit provided for the car body. That is, displaying an image taken by an imaging unit provided on the outside of the car body leads to elimination of blind areas and enhancement of safety. In addition, showing an image so as to compensate for the area which the driver cannot see makes it possible for the driver to confirm safety easily and comfortably. The display panel 51D can also be used as a lighting device.

Figure 12:
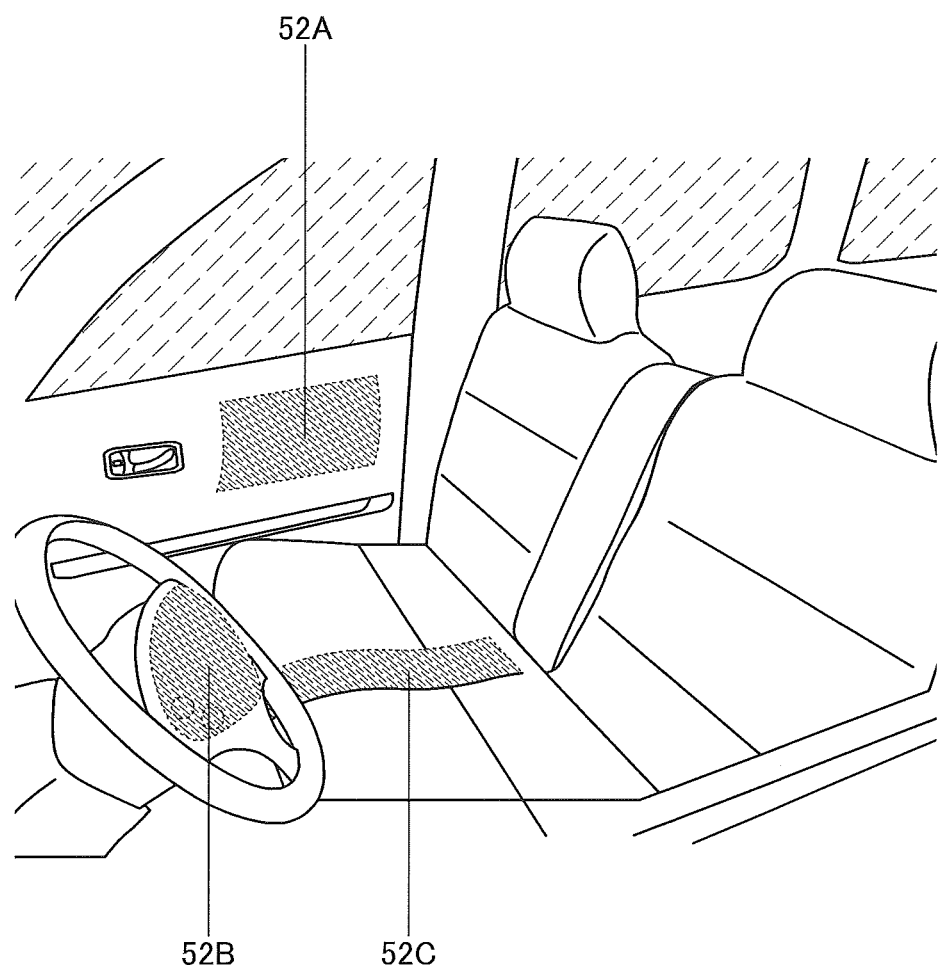
FIG. 12 illustrates a structure of display panels in a moving object.

FIG. 12 illustrates the inside of an automobile in which a bench seat is used as a driver's seat and a front passenger's seat. FIG. 12 illustrates a display panel 52A which is provided on a door, a display panel 52B which is provided on a steering wheel, and a display panel 52C which is provided in the middle of the seating surface of the bench seat.

The display panel 52A can compensate for the view hindered by the door by displaying an image taken by an imaging unit provided for the car body, for example.

The display panels 52B and 52C can provide a variety of kinds of information such as navigation data, a speedometer, a tachometer, a mileage, a fuel meter, a gearshift indicator, and air-condition setting. The content, layout, or the like of the display on the display panels can be changed freely to suit the user's preferences. The display panels 52B and 52C can also be used as lighting devices.

The display panels provided everywhere inside the automobile as illustrated in FIG. 11 and FIG. 12 are effectively used as units for transmitting an urgent signal out of the car by being used as lighting devices. In the case where an abnormal health condition of the user (driver) is sensed by a sensor or the like, for example, the display panels are made flash on and off at the highest luminance. The display panels in the display system of one embodiment of the present can be provided everywhere in the car and thus can transmit information effectively around the car as compared to text information and a hazard lamp.

Figure 13A:
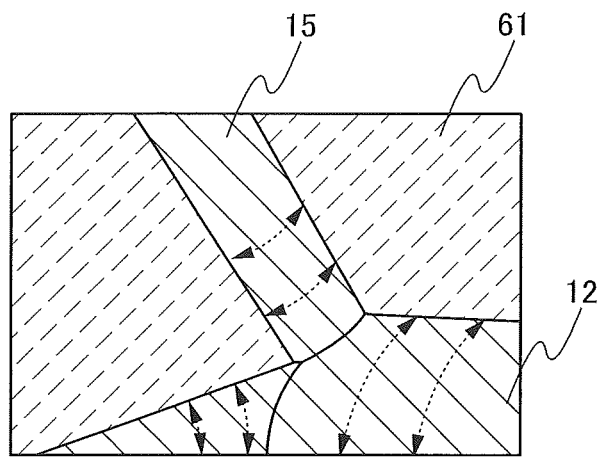
FIGS. 13A and 13B illustrate a structure of display panels in a moving object.
Figure 13B:
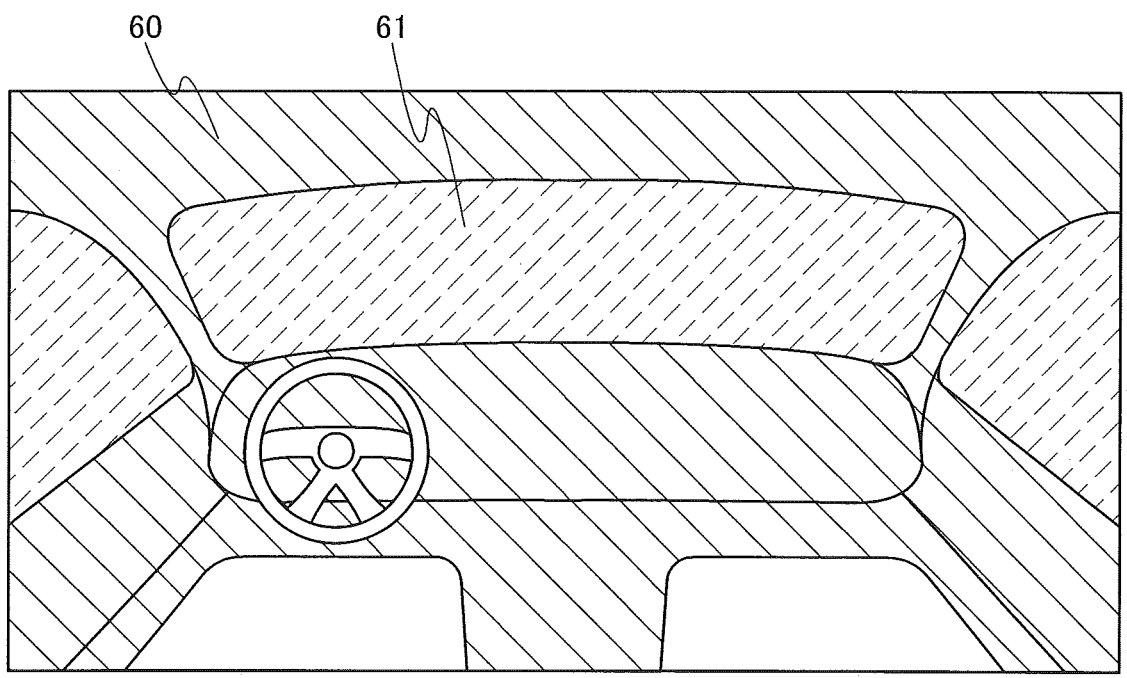

Like the above display panel, the display system of one embodiment of the present invention can be attached to a curved surface. Like the above display panels 51A to 51D and display panels 52A to 52C, for example, the display system can be attached everywhere inside the automobile. That is, the display system can be attached even to a curved surface such as the dashboard 12 and the pillar 15 in FIG. 13A. Therefore, a display panel 60 can be provided on the inner surface of the car body except for windows 61 as illustrated in FIG. 13B. This structure can display images outside of the car body except for the outside of the windows 61, so that blind areas can be eliminated and the safety can be enhanced.

Figure 14A:
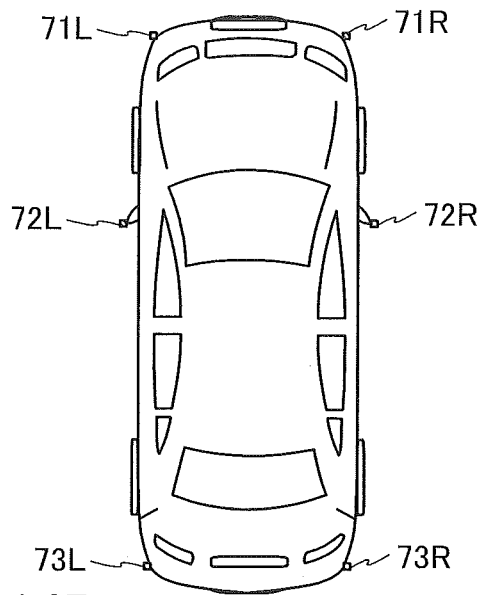
FIGS. 14A and 14B illustrate arrangement of imaging devices and display panels in a moving object.

When the display panels are provided on the inner surfaces of the car body except for the windows 61 as illustrated in FIG. 13B, a plurality of imaging devices 71L, 72L, 73L, 71R, 72R, and 73R are provided on the outer side of the car body as illustrated in FIG. 14A. Note that two or more imaging devices are preferably arranged to obtain information about a distance to an object.

Figure 14B:
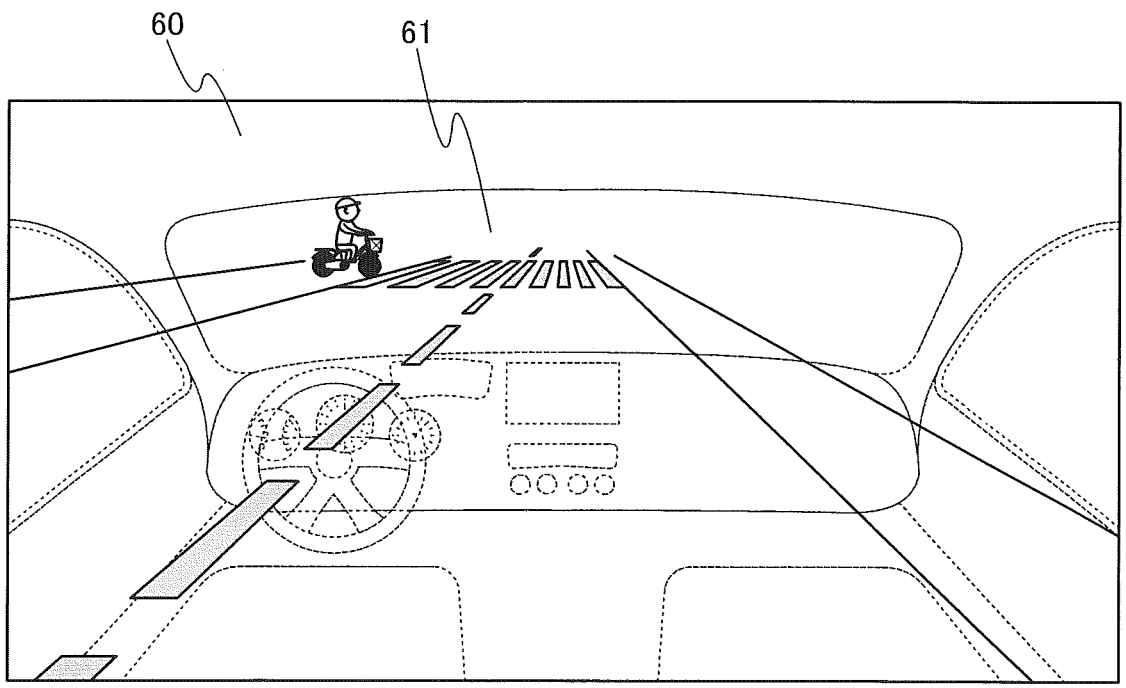

The structures in FIG. 13B and FIG. 14A make it possible to display the images outside of the car body except for outside of the windows 61 as illustrated in FIG. 14B. Thus, the moving body can compensate for the user's blind areas and enhance its safety.

In the structure including the display panels 60 provided on the inner surfaces of the car body except for the windows 61, a position on which the meter or the like is displayed is changeable because the display panels are provided on a variety of places. In this case, the display positions can be switched freely to prevent the meter or the like from being difficult to see under direct sunlight.

<Examples of Moving Object>

Examples of a moving object will be described.

The display system of one embodiment of the present invention can be used for a moving object including a surface on which a display panel can be provided. Specific examples of the moving objects are illustrated in FIGS. 15A to 15D.

Figure 15A:
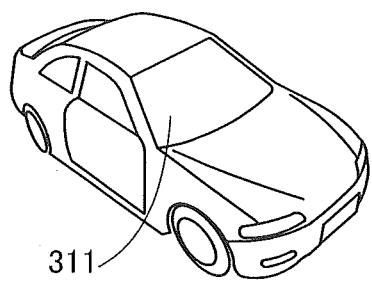
FIGS. 15A to 15D illustrate examples of moving objects.

FIG. 15A illustrates an automobile 301. The automobile 301 includes a window 311. A moving object of one embodiment of the present invention can be the automobile 301 including the window 311. The display panel used for the display system can be provided on the surface inside the automobile 301. This structure enables the display panel in the automobile 301 to display outside images of the automobile 301. Thus, the automobile 301 can reduce the blind areas excluding the window 311.

Figure 15B:
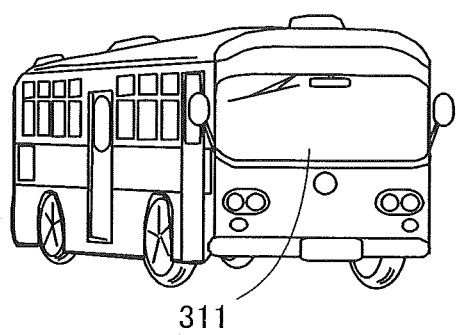

FIG. 15B illustrates a bus 302. The bus 302 includes the window 311. A moving object of one embodiment of the present invention can be the bus 302 including the window 311. The display panel used for the display system can be provided on the surface inside the bus 302. This structure enables the display panel in the bus 302 to display outside images of the bus 302. Thus, the bus 302 can reduce the blind areas excluding the window 311.

Figure 15C:
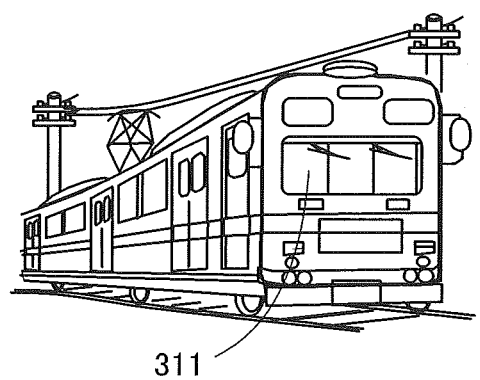

FIG. 15C illustrates a train 303. The train 303 includes the window 311. A moving object of one embodiment of the present invention can be the train 303 including the window 311. The display panel used for the display system can be provided on the surface inside the train 303. This structure enables the display panel in the train 303 to display outside images of the train 303. Thus, the train 303 can reduce the blind areas excluding the window 311.

Figure 15D:
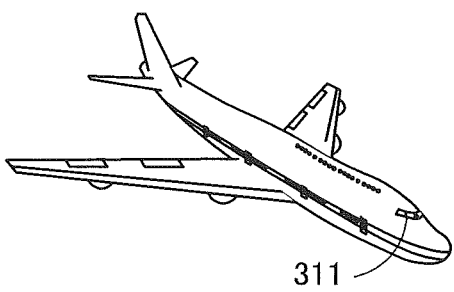

FIG. 15D illustrates an airplane 304. The airplane 304 includes the window 311. A moving object of one embodiment of the present invention can be the airplane 304 including the window 311. The display panel used for the display system can be provided on the surface inside the airplane 304. This structure enables the display panel in the airplane 304 to display outside images of the airplane 304. Thus, the airplane 304 can reduce the blind areas excluding the window 311.

<Notes on Description of this Specification and the Like>

In this specification and the like, ordinal numbers such as "first," "second," and "third" are used in order to avoid confusion among components. Thus, the terms do not limit the number or order of components.

In a block diagram in this specification and the like, components are functionally classified and shown by blocks that are independent of each other. However, in an actual circuit and the like, such components are sometimes hard to classify functionally, and there is a case in which one circuit is concerned with a plurality of functions or a case in which a plurality of circuits are concerned with one function. Therefore, blocks in a block diagram do not necessarily show components described in the specification, which can be explained with another term as appropriate depending on the situation.

The same elements or elements having similar functions, elements formed using the same material, elements formed at the same time, or the like in the drawings are denoted by the same reference numerals, and the description thereof is not repeated in some cases.

In this specification or the like, the terms "one of a source and a drain" (or a first electrode or a first terminal) and "the other of the source and the drain" (or a second electrode or a second terminal) are used to describe the connection relation of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In this specification and the like, "voltage" and "potential" can be replaced with each other. The term "voltage" refers to a potential difference from a reference potential. When the reference potential is a ground potential, for example, "voltage" can be replaced with "potential." The ground potential does not necessarily mean 0V. Potentials are relative values, and the potential applied to a wiring or the like is changed depending on the reference potential, in some cases.

In this specification and the like, a switch is conducting (on state) or not conducting (off state) to determine whether current flows therethrough or not. Alternatively, the switch is an element having a function of selecting and changing a current path.

Examples of a switch are an electrical switch, a mechanical switch, and the like. That is, any element can be used as a switch as long as it can control current, without limitation to a certain element.

In the case of using a transistor as a switch, an "on state" of the transistor refers to a state in which a source and a drain of the transistor are electrically short-circuited. Furthermore, an "off state" of the transistor refers to a state in which the source and the drain of the transistor are electrically disconnected. In the case where a transistor operates just as a switch, the polarity (conductivity type) of the transistor is not particularly limited to a certain type.

In this specification and the like, when it is described that "A and B are connected to each other," the case where A and B are electrically connected to each other is included in addition to the case where A and B are directly connected to each other. Here, the expression "A and B are electrically connected" means the case where electric signals can be transmitted and received between A and B when an object having any electric action exists between A and B.

This application is based on Japanese Patent Application serial no. 2016-100337 filed with Japan Patent Office on May 19, 2016, the entire contents of which are hereby incorporated by reference.

What is claimed is:

1. A display system comprising:
a curved display panel;
an image sensor, the image sensor specifying a point from which the curved display panel is to be seen; and
a display driver,
wherein the curved display panel comprises:
    a first display region; and
    a second display region, the second display region being wider than the first display region,
wherein the first display region and the second display region are determined in light of a shape of the curved display panel and the point from which the curved display panel is to be seen,
wherein the display driver is configured to generate first analog data and second analog data, the first analog data being generated by a first clock signal and first digital data, and the second analog data being generated by a second clock signal and second digital data,
wherein the display driver transmits the first analog data to the first display region and transmits the second analog data to the second display region,
wherein a first period in which first image data is sent and a second period in which second image data is sent are equally long,
wherein the first analog data is spatially compressed by the first clock signal as compared with the second analog data which is spatially decompressed by the second clock signal,
wherein a frequency of the first clock signal is lower than a frequency of the second clock signal,
wherein a period in which the first clock signal is sent is longer than a period in which the second clock signal is sent,
wherein the first period overlaps with the period in which the first clock signal is sent, and
wherein the period in which the first clock signal is sent is longer or several times as long as the first period.

2. The display system according to claim 1, further comprising:
wherein a proportion of the first display region to the second display region can be changed when the point from which the curved display panel is to be seen is moved from a first point to a second point.

3. The display system according to claim 1,
wherein the display driver comprises:
    a shift register; and
    a digital-analog conversion circuit,
wherein any one of the first clock signal and the second clock signal is input to the shift register, and
wherein any one of the first digital data and the second digital data is input to the digital-analog conversion circuit.

4. The display system according to claim 1, further comprising:
an oscillator circuit,
wherein the oscillator circuit is electrically connected to the display driver,
wherein the oscillator circuit comprises:
    an inverter; and
    a circuit comprising:
        a first terminal; and
        a second terminal,
wherein the first terminal is electrically connected to an output terminal of the inverter,
wherein the circuit is configured to change a resistance between the first terminal and the second terminal, wherein, when a resistance between the first terminal and the second terminal of the circuit is a first resistance, the oscillator circuit is configured to generate the first clock signal corresponding to the first resistance and supply the first clock signal to the display driver owing to the configuration of changing the resistance, wherein, when a resistance between the first terminal and the second terminal of the circuit is a second resistance, the oscillator circuit is configured to generate the second clock signal corresponding to the second resistance and supply the second clock signal to the display driver owing to the configuration of changing the resistance, and wherein the first resistance is higher than the second resistance.

5. The display system according to claim 4, wherein the circuit further comprises:
a data retention circuit comprising:
a third terminal; and
a fourth terminal,
wherein the third terminal is electrically connected to the first terminal,
wherein the fourth terminal is electrically connected to the second terminal,
wherein the data retention circuit is configured to store data, and
wherein the data retention circuit is configured to select whether the third terminal and the fourth terminal are electrically disconnected from each other or the resistance between the third terminal and the fourth terminal is set to a value based on the data.

6. The display system according to claim 1, wherein the curved display panel comprises:
a transistor comprising an oxide semiconductor in a channel formation region; and
a display element electrically connected to the transistor.

7. The display system according to claim 6, wherein the display element is an organic electroluminescent element.

8. A moving object comprising the display system according to claim 1.

9. The display system according to claim 1, wherein an image corresponding to the first digital data and an image corresponding to the second digital data would have the same width if the image corresponding to the first digital data and the image corresponding to the second digital data were displayed on a flat display surface.

10. A display system comprising:
a display panel having a curved display surface;
an image sensor, the image sensor specifying a point from which the curved display surface is to be seen; and
a display driver comprising a first wiring and a second wiring, wherein
the first wiring is configured to transmit a first clock signal in a first period and to transmit a second clock signal in a second period, wherein
the second wiring is configured to transmit first image data in a third period and to transmit second image data in a fourth period, wherein a length of the third period is the same as a length of the fourth period, wherein the first period includes the third period and is longer than the third period, wherein the second period overlaps with the fourth period and is shorter than the fourth period, wherein the display driver is configured to generate first image data and second image data, the first image data being generated by the first clock signal, and the second image data being generated by the second clock signal, wherein the curved display surface comprises a first display region and a second display region, wherein the first display region and the second display region are determined in light of a shape of the curved display surface and the point from which the curved display surface is to be seen, wherein the first display region displays the first image data, wherein the second display region displays the second image data, and wherein the first image data is spatially compressed as compared with the second image data which is spatially decompressed.

11. The display system according to claim 10, further comprising:
wherein a proportion of the first display region to the second display region can be changed when the point from which the curved display surface is to be seen is moved from a first point to a second point.

12. The display system according to claim 10, further comprising:
an oscillator circuit,
wherein the oscillator circuit is electrically connected to the display driver,
wherein the oscillator circuit comprises:
an inverter; and
a circuit comprising:
a first terminal; and
a second terminal,
wherein the first terminal is electrically connected to an output terminal of the inverter,
wherein the circuit is configured to change a resistance between the first terminal and the second terminal,
wherein, when a resistance between the first terminal and the second terminal of the circuit is a first resistance, the oscillator circuit is configured to generate the first clock signal corresponding to the first resistance and supply the first clock signal to the display driver owing to the configuration of changing the resistance, wherein, when a resistance between the first terminal and the second terminal of the circuit is a second resistance, the oscillator circuit is configured to generate the second clock signal corresponding to the second resistance and supply the second clock signal to the display driver owing to the configuration of changing the resistance, and wherein the first resistance is higher than the second resistance.

13. The display system according to claim 12, wherein the circuit further comprises:
a data retention circuit comprising:
a third terminal; and
a fourth terminal,
wherein the third terminal is electrically connected to the first terminal,
wherein the fourth terminal is electrically connected to the second terminal,
wherein the data retention circuit is configured to store data, and
wherein the data retention circuit is configured to select whether the third terminal and the fourth terminal are electrically disconnected from each other or the resistance between the third terminal and the fourth terminal is set to a value based on the data.

14. A method for image processing using a display system, the display system comprising a display driver and a display panel having a curved display surface, comprising the steps of:
   detecting, by an image sensor, a point from which the curved display surface is to be seen;
   transmitting a first clock signal in a first period and a second clock signal in a second period from a first wiring to the display driver;
   transmitting first image data in a third period and second image data in a fourth period from a second wiring to the display driver;
   generating first image data by the first clock signal;
   generating second image data by the second clock signal;
   displaying the first image data in a first display region of the curved display surface, and
   displaying the second image data in a second display region of the curved display surface, wherein
   the first display region and the second display region are determined in light of a shape of the curved display surface and the point from which the curved display surface is to be seen, wherein
   a length of the third period is the same as a length of the fourth period, wherein the first period includes the third period and is longer than the third period, wherein the second period overlaps with the fourth period and is shorter than the fourth period, wherein the first image data is spatially compressed and the second image data is spatially decompressed.

* * * * *